(12) United States Patent
Zhou et al.

(10) Patent No.: US 12,524,853 B2
(45) Date of Patent: Jan. 13, 2026

(54) INPAINTING DIGITAL IMAGES USING A HYBRID WIRE REMOVAL PIPELINE

(71) Applicant: Adobe Inc., San Jose, CA (US)

(72) Inventors: Yuqian Zhou, Urbana, IL (US); Connelly Barnes, Seattle, WA (US); Zijun Wei, San Jose, CA (US); Zhe Lin, Fremont, CA (US); Elya Shechtman, Seattle, WA (US); Sohrab Amirghodsi, Seattle, WA (US); Xiaoyang Liu, Bellevue, WA (US)

(73) Assignee: Adobe Inc., San Jose, CA (US)

( * ) Notice: Subject to any disclaimer, the term of this patent is extended or adjusted under 35 U.S.C. 154(b) by 288 days.

(21) Appl. No.: 18/179,855

(22) Filed: Mar. 7, 2023

(65) Prior Publication Data
US 2024/0303787 A1    Sep. 12, 2024

(51) Int. Cl.
*G06T 5/77* (2024.01)
*G06T 7/11* (2017.01)
*G06V 20/10* (2022.01)

(52) U.S. Cl.
CPC .................. *G06T 5/77* (2024.01); *G06T 7/11* (2017.01); *G06V 20/176* (2022.01); *G06T 2207/20021* (2013.01); *G06T 2207/30184* (2013.01)

(58) Field of Classification Search
CPC ... G06T 5/77; G06T 7/11; G06T 2207/20021; G06T 2207/30184; G06T 5/30;
(Continued)

(56) References Cited

U.S. PATENT DOCUMENTS 9,760,978 B1 *  9/2017  Lu .............................. G06T 5/50
2015/0104072 A1 *  4/2015  Jeong ....................... G06T 7/13
                                                                382/104
(Continued)

OTHER PUBLICATIONS

Kerautret, Bertrand et al. "Meaningful Thickness Detection on Polygonal Curve", Feb. 2012 [retrieved on Jun. 28, 2025], ICPRAM 2012. Retrieved from ResearchGate: <URL: https://www.researchgate.net/publication/233743073_Meaningful_Thickness_Detection_on_Polygonal_Curve>. (Year: 2012).*

(Continued)

*Primary Examiner* — Matthew C Bella
*Assistant Examiner* — Nicholas John Helco
(74) *Attorney, Agent, or Firm* — Keller Preece PLLC

(57) ABSTRACT

The present disclosure relates to systems, methods, and non-transitory computer readable media for inpainting a digital image using a hybrid wire removal pipeline. For example, the disclosed systems use a hybrid wire removal pipeline that integrates multiple machine learning models, such as a wire segmentation model, a hole separation model, a mask dilation model, a patch-based inpainting model, and a deep inpainting model. Using the hybrid wire removal pipeline, in some embodiments, the disclosed systems generate a wire segmentation from a digital image depicting one or more wires. The disclosed systems also utilize the hybrid wire removal pipeline to extract or identify portions of the wire segmentation that indicate specific wires or portions of wires. In certain embodiments, the disclosed systems further inpaint pixels of the digital image corresponding to the wires indicated by the wire segmentation mask using the patch-based inpainting model and/or the deep inpainting model.

20 Claims, 14 Drawing Sheets

(58) Field of Classification Search
CPC .... G06T 5/20; G06T 5/60; G06T 5/75; G06T 7/194; G06T 2207/20084; G06T 2207/20104; G06T 2207/20112; G06T 2207/20212; G06T 2207/20216; G06T 2207/20221; G06T 2207/20224; G06V 20/176; G06V 20/70; H04N 1/4097; H04N 1/40093; H04N 1/62; G03C 11/04
See application file for complete search history.

(56) References Cited

U.S. PATENT DOCUMENTS

| | | | |
|---|---|---|---|
| 2016/0335748 A1* | 11/2016 | Newson | G06T 5/77 |
| 2016/0350603 A1* | 12/2016 | Suddamalla | G06T 7/13 |
| 2019/0311205 A1* | 10/2019 | Mittal | G06F 18/214 |
| 2021/0304387 A1* | 9/2021 | Schroers | G06N 3/045 |
| 2022/0375100 A1* | 11/2022 | Qi | G06T 7/194 |
| 2023/0118460 A1* | 4/2023 | Liba | G06T 7/155 |
| 2024/0028871 A1* | 1/2024 | Chiu | G06T 7/62 |
| 2024/0111968 A1* | 4/2024 | Umapathy | G06V 30/10 |
| 2024/0169501 A1* | 5/2024 | Liu | G06T 5/60 |

OTHER PUBLICATIONS

Pixel 6, a smarter chip for a smarter phone—google store. https://store.google.com/product/pixel_6?hl=en- US. (Accessed on Nov. 14, 2021).

Rabab Abdelfattah, Xiaofeng Wang, and Song Wang. Ttpla: An aerial-image dataset for detection and segmentation of transmission towers and power lines. In Proceedings of the Asian Conference on Computer Vision, 2020.

Connelly Barnes, Eli Shechtman, Adam Finkelstein, and Dan B Goldman. Patchmatch: A randomized correspondence algorithm for structural image editing. ACM Trans. Graph., 28(3):24, 2009.

Liang-Chieh Chen, George Papandreou, Iasonas Kokkinos, Kevin Murphy, and Alan L Yuille. Deeplab: Semantic image segmentation with deep convolutional nets, atrous convolution, and fully connected crfs. IEEE transactions on pattern analysis and machine intelligence, 40(4):834-848, 2017.

Liang-Chieh Chen, George Papandreou, Florian Schroff, and Hartwig Adam. Rethinking atrous convolution for semantic image segmentation. arXiv preprint arXiv:1706.05587, 2017.

Liang-Chieh Chen, Yukun Zhu, George Papandreou, Florian Schroff, and Hartwig Adam. Encoder-decoder with atrous separable convolution for semantic image segmentation. In Proceedings of the European conference on computer vision (ECCV), pp. 801-818, 2018.

Wuyang Chen, Ziyu Jiang, Zhangyang Wang, Kexin Cui, and Xiaoning Qian. Collaborative global-local networks for memory-efficient segmentation of ultra-high resolution im-ages. In Proceedings of the IEEE/CVF Conference on Computer Vision and Pattern Recognition, pp. 8924-8933, 2019.

Ho Kei Cheng, Jihoon Chung, Yu-Wing Tai, and Chi-Keung Tang. Cascadepsp: toward class-agnostic and very high-resolution segmentation via global and local refinement. In Proceedings of the IEEE/CVF Conference on Computer Vision and Pattern Recognition, pp. 8890-8899, 2020.

Soheil Darabi, Eli Shechtman, Connelly Barnes, Dan B Goldman, and Pradeep Sen. Image melding: Combining inconsistent images using patch-based synthesis. ACM Transactions on graphics (TOG), 31(4):1-10, 2012.

Shaohua Guo, Liang Liu, Zhenye Gan, Yabiao Wang, Wuhao Zhang, Chengjie Wang, Guannan Jiang, Wei Zhang, Ran Yi, Lizhuang Ma, et al. Isdnet: Integrating shallow and deep networks for efficient ultra-high resolution segmentation. In Proceedings of the IEEE/CVF Conference on Computer Vision and Pattern Recognition, pp. 4361-4370, 2022.

Kaiming He, Xiangyu Zhang, Shaoqing Ren, and Jian Sun. Deep residual learning for image recognition. In Proceedings of the IEEE conference on computer vision and pattern recognition, pp. 770-778, 2016.

Zilong Huang, Xinggang Wang, Lichao Huang, Chang Huang, Yunchao Wei, and Wenyu Liu. Ccnet: Criss-cross attention for semantic segmentation. In Proceedings of the IEEE/CVF International Conference on Computer Vision, pp. 603-612, 2019.

Chuong Huynh, Anh Tuan Tran, Khoa Luu, and Minh Hoai. Progressive semantic segmentation. In Proceedings of the IEEE/CVF Conference on Computer Vision and Pattern Recognition, pp. 16755-16764, 2021.

Satoshi Iizuka, Edgar Simo-Serra, and Hiroshi Ishikaw, Globally and locally consistent image completion. ACM CVPR 2023 Submission.

Jitesh Jain, Yuqian Zhou, Ning Yu, and Humphrey Shi. Keys to better image inpainting: Structure and texture go hand in hand. arXiv preprint arXiv:2208.03382, 2022.

Oshada Jayasinghe, Damith Anhettigama, Sahan Hemachandra, Shenali Kariyawasam, Ranga Rodrigo, and Peshala Jayasekara. Swiftlane: Towards fast and efficient lane detection. arXiv preprint arXiv:2110.11779, 2021.

Tero Karras, Samuli Laine, Miika Aittala, Janne Hellsten, Jaakko Lehtinen, and Timo Aila. Analyzing and improving the image quality of stylegan. In Proceedings of the IEEE/CVF conference on computer vision and pattern recognition, pp. 8110-8119, 2020.

Alexandre Kaspar, Boris Neubert, Dani Lischinski, Mark Pauly, and Johannes Kopf. Self tuning texture optimization. In Computer Graphics Forum, vol. 34, pp. 349-359. Wiley Online Library, 2015.

Bo Li, Cheng Chen, Shiwen Dong, and Junfeng Qiao. Transmission line detection in aerial images: An instance segmentation approach based on multitask neural networks. Signal Processing: Image Communication, 96:116278, 2021.

Tsung-Yi Lin, Priya Goyal, Ross Girshick, Kaiming He, and Piotr Dollar. Focal loss for dense object detection. In Proceedings of the IEEE international conference on computer vision, pp. 2980-2988, 2017.

Guilin Liu, Fitsum A Reda, Kevin J Shih, Ting-Chun Wang, Andrew Tao, and Bryan Catanzaro. Image inpainting for irregular holes using partial convolutions. In Proceedings of the European conference on computer vision (ECCV), pp. 85-100, 2018.

Ze Liu, Yutong Lin, Yue Cao, Han Hu, Yixuan Wei, Zheng Zhang, Stephen Lin, and Baining Guo. Swin transformer: Hierarchical vision transformer using shifted windows. arXiv preprint arXiv:2103.14030, 2021.

Ilya Loshchilov and Frank Hutter. Decoupled weight decay regularization. arXiv preprint arXiv:1711.05101, 2017.

Van Nhan Nguyen, Robert Jenssen, and Davide Roverso. Ls-net: Fast single-shot line-segment detector. arXiv preprint arXiv:1912.09532, 2019.

Deepak Pathak, Philipp Krahenbuhl, Jeff Donahue, Trevor 963 Darrell, and Alexei A Efros. Context encoders: Feature learning by inpainting. In Proceedings of the IEEE conference on computer vision and pattern recognition, pp. 2536-2544, 2016.

Aditya Ramesh, Prafulla Dhariwal, Alex Nichol, Casey Chu, and Mark Chen. Hierarchical text-conditional image generation with clip latents. arXiv preprint arXiv:2204.06125, 2022.

Rene' Ranftl, Alexey Bochkovskiy, and Vladlen Koltun. Vision transformers for dense prediction. In Proceedings of the IEEE/CVF International Conference on Computer Vision, pp. 12179-12188, 2021.

Robin Rombach, Andreas Blattmann, Dominik Lorenz, Patrick Esser, and Bjorn Ommer. High-resolution image synthesis with latent diffusion models. In Proceedings of the IEEE/CVF Conference on Computer Vision and Pattern Recognition, pp. 10684-10695, 2022.

Abhinav Shrivastava, Abhinav Gupta, and Ross Girshick. Training region-based object detectors with online hard ex-ample mining. In Proceedings of the IEEE conference on computer vision and pattern recognition, pp. 761-769, 2016.

Jinming Su, Chao Chen, Ke Zhang, Junfeng Luo, Xiaoming Wei, and Xiaolin Wei. Structure guided lane detection. arXiv preprint arXiv:2105.05403, 2021.

Roman Suvorov, Elizaveta Logacheva, Anton Mashikhin, Anastasia Remizova, Arsenii Ashukha, Aleksei Silvestrov, Naejin Kong, Harshith Goka, Kiwoong Park, and Victor Lempitsky. Resolution- robust

(56) References Cited

OTHER PUBLICATIONS large mask inpainting with fourier convolutions. In Proceedings of the IEEE/CVF Winter Conference on Applications of Computer Vision, pp. 2149-2159, 2022.

Lucas Tabelini, Rodrigo Berriel, Thiago M Paixao, Claudine Badue, Alberto F De Souza, and Thiago Oliveira-Santos. Keep your eyes on the lane: Real-time attention-guided lane detection. In Proceedings of the IEEE/CVF Conference on Computer Vision and Pattern Recognition, pp. 294-302, 2021.

Ashish Vaswani, Noam Shazeer, Niki Parmar, Jakob Uszkoreit, Llion Jones, Aidan N Gomez, Łukasz Kaiser, and Illia Polosukhin. Attention is all you need. In Advances in neural information processing systems, pp. 5998-6008, 2017.

Yonatan Wexler, Eli Shechtman, and Michal Irani. Space-time completion of video. IEEE Transactions on pattern analysis and machine intelligence, 29(3):463-476, 2007.

Enze Xie, Wenhai Wang, Zhiding Yu, Anima Anandkumar, Jose M Alvarez, and Ping Luo. Segformer: Simple and efficient design for semantic segmentation with transformers. arXiv preprint arXiv:2105.15203, 2021.

Omer Emre Yetgin, Omer Nezih Gerek, and Omer Nezih Power image dataset (infrared-ir and visible light-vl). Mendeley Data, 8, 2017.

Zili Yi, Qiang Tang, Shekoofeh Azizi, Daesik Jang, and Zhan Xu. Contextual residual aggregation for ultra high-resolution image inpainting. In Proceedings of the IEEE/CVF Conference on Computer Vision and Pattern Recognition, pp. 7508-7517, 2020.

Jiahui Yu, Zhe Lin, Jimei Yang, Xiaohui Shen, and Thomas S Huang. Generative image inpainting with con- textual attention. In Proceedings of the IEEE conference on computer vision and pattern recognition, pp. 5505-5514, 2018.

Jiahui Yu, Zhe Lin, Jimei Yang, Xiaohui Shen, Xin Lu, and Thomas S Huang. Free-form image inpainting with gated convolution. In Proceedings of the IEEE/CVF international conference on computer vision, pp. 4471-4480, 2019.

Yu Zeng, Zhe Lin, Jimei Yang, Jianming Zhang, Eli Shechtman, and Huchuan Lu. High-resolution image inpainting with iterative confidence feedback and guided upsampling. In European conference on computer vision, pp. 1-17. Springer, 2020.

Heng Zhang, Wen Yang, Huai Yu, Haijian Zhang, and Gui-Song Xia. Detecting power lines in uav images with convolutional features and structured constraints. Remote Sensing, 11(11), 2019.

Lingzhi Zhang, Connelly Barnes, Kevin Wampler, Sohrab Amirghodsi, Eli Shechtman, Zhe Lin, and Jianbo Shi. In-painting at modern camera resolution by guided patchmatch with auto-curation. In European Conference on Computer 1040 Vision, pp. 51-67.

Hengshuang Zhao, Jianping Shi, Xiaojuan Qi, Xiaogang Wang, and Jiaya Jia. Pyramid scene parsing network. In Proceedings of the IEEE conference on computer vision and pattern recognition, pp. 2881-2890, 2017.

Shengyu Zhao, Jonathan Cui, Yilun Sheng, Yue Dong, Xiao Liang, Eric I Chang, and Yan Xu. Large scale image completion via co-modulated generative adversarial networks. arXiv preprint arXiv:2103.10428, 2021.

Haitian Zheng, Zhe Lin, Jingwan Lu, Scott Cohen, Eli Shechtman, Connelly Barnes, Jianming Zhang, Ning Xu, Sohrab Amirghodsi, and Jiebo Luo. Cm-gan: Image inpainting with cascaded modulation gan and object-aware training. arXiv preprint arXiv:2203.11947, 2022.

Sixiao Zheng, Jiachen Lu, Hengshuang Zhao, Xiatian Zhu, Zekun Luo, Yabiao Wang, Yanwei Fu, Jianfeng Feng, Tao 1055 Xiang, Philip HS Torr, et al. Rethinking semantic segmentation from a sequence-to-sequence perspective with transformers. In Proceedings of the IEEE/CVF Conference on Computer Vision and Pattern Recognition, pp. 6881-6890, 2021.

Bolei Zhou, Agata Lapedriza, Aditya Khosla, Aude Oliva, and Antonio Torralba. Places: A 10 million image database for scene recognition. IEEE Transactions on Pattern Analysis and Machine Intelligence, 2017.

\* cited by examiner

| Model | PSNR↑ | LPIPS↓ | FID↓ | Speed (s/img) |
|---|---|---|---|---|
| PatchMatch | 50.29 | 0.0294 | 5.0403 | - |
| DeepFillv2 | 47.01 | 0.0374 | 8.0086 | 0.009 |
| CMGAN | 50.07 | 0.0255 | 3.8286 | 0.141 |
| FcF | 48.82 | 0.0322 | 4.7848 | 0.048 |
| LDM | 45.96 | 0.0401 | 10.1687 | 4.280 |
| Big-LaMa | 49.63 | 0.0267 | 4.1245 | 0.034 |
| Wire Inpainting System | 50.06 | 0.0259 | 3.6950 | 0.034 |

1300

```
Generating A Wire Segmentation Mask 1302
                │
                ▼
Extracting Wire Holes From The Wire Segmentation Mask 1304
                │
                ▼
Generating A Modified Digital Image By Inpainting The Wire Holes 1306
                │
                ▼
Providing The Modified Digital Image For Display 1308
```

*Fig. 13*

INPAINTING DIGITAL IMAGES USING A HYBRID WIRE REMOVAL PIPELINE

BACKGROUND

In the field of digital image editing, machine learning models have become increasingly effective in various applications, such as producing realistic images from randomly sampled seeds or image inpainting. These models, such as deep neural networks and generative adversarial networks, have revolutionized digital image synthesis, enabling digital image modifications by inpainting pixels to remove objects, fix defects, or add new objects. Indeed, inpainting models have made significant progress in generating or synthesizing pixels for filling holes of a digital image. Despite the advances of conventional digital image systems that utilize these models, however, conventional systems continue to suffer from a number of disadvantages, such as inaccuracy in inpainting digital images to remove wires, such as telephone lines and power lines depicted in digital images.

SUMMARY

This disclosure describes one or more embodiments of systems, methods, and non-transitory computer readable media that solve one or more of the foregoing or other problems in the art by inpainting a digital image using a hybrid wire removal pipeline. For example, the disclosed systems use a hybrid wire removal pipeline that integrates multiple machine learning models, such as a wire segmentation model, a patch-based inpainting model, and a deep inpainting model, among others. Using the wire segmentation model within the hybrid wire removal pipeline, in some embodiments, the disclosed systems generate a wire segmentation from a digital image depicting one or more wires. In some cases, the disclosed systems also utilize constituent models of the hybrid wire removal pipeline to extract or identify portions of the wire segmentation that indicate specific wires or portions of wires. In certain embodiments, the disclosed systems further inpaint pixels of the digital image corresponding to the wires indicated by the wire segmentation mask using the patch-based inpainting model and/or the deep inpainting model.

BRIEF DESCRIPTION OF THE DRAWINGS

This disclosure describes one or more embodiments of the invention with additional specificity and detail by referencing the accompanying figures. The following paragraphs briefly describe those figures, in which:

FIG. 13 illustrates an example flowchart of a series of acts for inpainting a digital image to remove wires using a hybrid wire removal pipeline in accordance with one or more embodiments.

DETAILED DESCRIPTION

Figure 1:
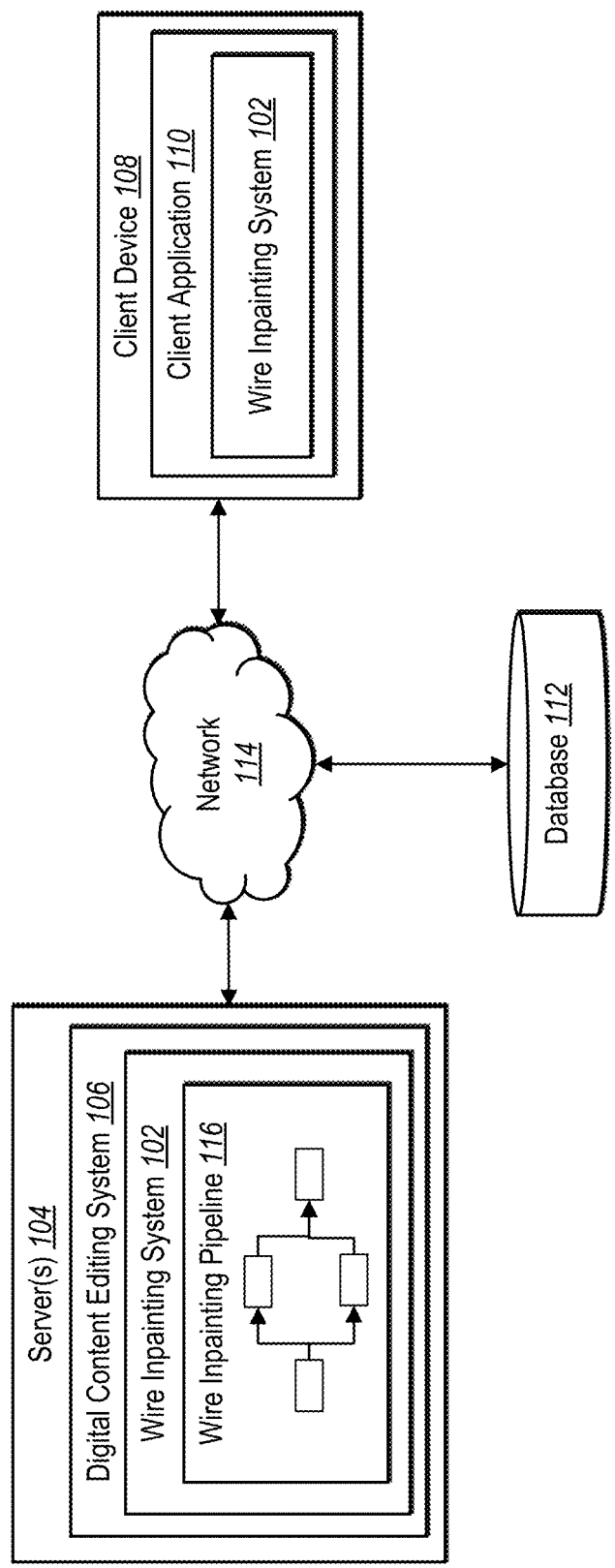
FIG. 1 illustrates an example system environment in which a wire inpainting system operates in accordance with one or more embodiments.

This disclosure describes one or more embodiments of a wire inpainting system that inpaints pixels depicting wires within digital images using a hybrid wire removal pipeline. For example, using the pipeline, the wire inpainting system segments a digital image to identify pixels that depict wires and inpaints, or replaces, the wire pixels with pixels matching (or resembling) those of the background underlaying the wire. In some embodiments, the hybrid wire removal pipeline includes multiple machine learning models, each dedicated to a different task as part of inpainting, or replacing, wire pixels in a digital image. For instance, the pipeline includes a scene semantic segmentation model that segments objects depicted within a digital image to label different pixel segments (e.g., "sky" pixels, "mountain" pixels, or "building" pixels). In some cases, the pipeline also includes a wire segmentation model that segments pixels of a digital image to indicate pixels depicting wires. In one or more embodiments, the pipeline includes a hole separation model that separates or extracts wire holes from image segmentations (e.g., as generated by the scene semantic segmentation model and/or the wire segmentation model). In these or other embodiments, the pipeline also includes a mask dilation model that dilates wire masks indicating wire holes to more accurately capture or encompass the pixels depicting wires in a digital image. In some embodiments, the pipeline includes one or more inpainting models that inpaint, or replace, wire pixels with background pixels to remove the appearance of wires in the digital image.

As just mentioned, in one or more embodiments, the wire inpainting system inpaints a digital image to remove the appearance of wires depicted in the digital image. As part of the inpainting process, in certain embodiments, the wire inpainting system generates a wire segmentation mask from a digital image. For instance, the wire inpainting system utilizes a wire segmentation model and/or a scene semantic segmentation model to generate a wire segmentation mask that indicates wires depicted within the digital image.

As also mentioned, in some embodiments, the wire inpainting system extracts or separates wire holes from the wire segmentation mask. For example, the wire inpainting system utilizes a hole separation model to extract wire holes that indicate pixels of the digital image to inpaint or replace. In some cases, the wire inpainting system extracts a first wire hole corresponding to wire pixels depicted against a uniform background (e.g., background pixels satisfying a uniformity threshold) and extracts a second wire hole corresponding to wire pixels (of the same wire or a different wire) depicted against a non-uniform background (e.g., background pixels that do not satisfy a uniformity threshold). For instance, the first wire hole can correspond to natural background pixels (which are generally more uniform, such as pixels depicting the sky), while the second wire hole can correspond to manmade background pixels (which are generally less uniform such as pixels depicting buildings, streets, or cars).

In certain embodiments, the wire inpainting system dilates the wire holes (or the wire segmentation mask) to more accurately identify or detect wire pixels to inpaint in a digital image. For instance, the wire uses a mask dilation model to dilate wire holes (or masks indicating wire pixels) to overcome certain defocus effects and perspective effects in digital images. In some cases, dilating the wire holes (or the wire segmentation mask) resolves two specific problems: 1) defocus effects of the optical system for the camera that results in blurred pixels around wires (e.g., wire colors blending into background pixels) and 2) perspective effects where segments or sections of a wire nearer to the camera appear wider and segments or sections farther from the camera appear thinner.

In one or more embodiments, the wire inpainting system utilizes a tile-based batching technique to efficiently process and inpainting wire pixels (e.g., in parallel batches). For example, the wire inpainting system divides a digital image into pixel tiles of a set resolution. From the pixel tiles, in some cases, the wire inpainting system identifies those tiles that depict wire pixels (e.g., wire tiles). In some embodiments, the wire inpainting system also batches the wire tiles into groups such that no two tiles of a wire tile batch/group overlap one another. In other embodiments, the wire inpainting system batches wire tiles into groups where tiles in a common batch/group partially overlap (e.g., overlap by fewer than a threshold number of pixels). In certain cases, the wire inpainting system further inpaints wire tiles of a batch in parallel for fast, efficient wire inpainting.

In some embodiments, the wire inpainting system utilizes a single inpainting model (e.g., a diffusion-based model or a GAN-based model) to inpaint wire pixels of a digital image. In certain embodiments, the wire inpainting system utilizes different inpainting models to inpaint pixels indicated by different holes. For example, the wire inpainting system utilizes a first inpainting model (e.g., a patch-based inpainting model) to inpaint pixels indicated by a first wire hole (e.g., a wire hole corresponding to uniform, natural background pixels), and the wire inpainting system utilizes a second inpainting model (e.g., a deep inpainting model) to inpaint pixels indicated by a second wire hole (e.g., a wire hole corresponding to non-uniform, manmade background pixels). Accordingly, the wire inpainting system generates a realistic modified digital images that resembles the initial digital image, but with replacement pixels in place of wire pixels to remove the appearance of wires.

As suggested above, many conventional digital image systems exhibit a number of shortcomings or disadvantages, particularly in accuracy and efficiency in generating modified digital images. For example, some existing systems inaccurately remove wires from digital images. Specifically, as suggested above, existing systems often struggle to accurately identify pixels depicting wires (often missing pixels on the edges of wires where wires are blurry or bleeding into background pixels) and further struggle to replace the wire pixels with other pixels to generate a modified digital image. Inpainting wires using conventional systems often results in pixel artifacts (e.g., wire pieces) left behind after inpainting and/or filling wire pixels with unrealistic and unconvincing replacement pixels. Such inaccuracies are especially apparent when inpainting digital images that depict wires crossing over background pixels of various textures and colors, such as a single wire that transitions from overlaying a background of a building with many windows and various colors and textures to overlaying a background of sky pixels that are mostly blue.

In addition to their inaccuracies, some existing digital image systems are inefficient. More specifically, prior systems often inpaint pixels of a digital image in a strictly sequential manner, where image tiles are inpainted in series. Inpainting each image tile in series (e.g., one at a time) sometimes consumes excessive computer resources, such as processing power and computing time that could otherwise be preserved with a more efficient inpainting system.

In solving one or more of the aforementioned issues of prior systems, embodiments of the wire inpainting system provide improvements or advantages over conventional digital image systems. For example, embodiments of the wire inpainting system introduce a new hybrid wire removal pipeline not found in prior systems. To elaborate, unlike prior systems that use a single inpainting model, the wire inpainting system utilizes a hybrid pipeline that integrates multiple models, including a scene semantic segmentation model, a wire segmentation model, a hole separation model, a mask dilation model, a patch-based inpainting model, and/or a deep inpainting model.

Due at least in part to introducing the hybrid wire removal pipeline, in some embodiments, the wire inpainting system improves accuracy and quality over conventional systems. Indeed, while prior systems leave behind large numbers of wire remnants in their attempts to remove wires from digital images (especially from images depicting both manmade structures and natural scenes together), the wire inpainting system more accurately identifies and removes wire pixels from digital images. For example, the wire inpainting system utilizes a hole separation model to accurately extract wire holes for wires depicted in a digital image. In addition, the wire inpainting system intelligently utilizes multiple inpainting models to replace wire pixels indicated by the extracted wire holes. In some cases, the wire inpainting system inpaints wire pixels overlaid against natural backgrounds using a patch-based inpainting model and inpaints wire pixels overlaid against manmade backgrounds using a deep inpainting model. In some embodiments, the wire inpainting system further accounts for edge cases on borders where background pixels transition from manmade structures to natural scenes (or vice-versa). Using the disclosed techniques, the wire inpainting system generates higher quality digital images with fewer artifacts and better wire removal than prior systems.

As another example of improved accuracy, in one or more embodiments, the wire inpainting system provides better structure completion and color quality compared to previous systems. Whereas previous systems sometimes generate unrealistic and jarring results in boundary cases where background pixels transition from natural background pixels to manmade background pixels (or vice-versa), the wire inpainting system generates more realistic and accurate modified digital images. For example, the wire inpainting system utilizes a hole separation technique (involving an erosion process) to more accurately identify, and distinguish between, wire pixels against natural backgrounds and wire pixels against manmade backgrounds.

As a further example of improved accuracy, in some embodiments, the wire inpainting system provides better inpainting for pixels along boundaries or edges of wires. Indeed, many prior systems have no way to account for defocus effects for small (non-prominent) objects, which often cause blurred edges along wires. Such prior systems also frequently fail to account for changing wire diameters in a digital image that result from camera perspectives, where closer portions of a wire are larger than farther portions. The wire inpainting system, by contrast, is able to account for defocus effects and perspective effects by implementing a mask dilation model that dilates pixels along the boundary of a wire according to the diameter of the wire at the pixel locations, which ultimately results in more accurate inpainting and removal of wires.

In addition to improving accuracy, in some embodiments, the wire inpainting system improves efficiency over conventional digital image systems. For example, as opposed to conventional systems that serially process pixel tiles to inpaint a digital image in a sequential manner, some embodiments of the wire inpainting system uses a parallel batching technique to inpaint multiple tiles of the digital image in parallel (e.g., using a deep inpainting model). In some cases, the wire inpainting system can also (or alternatively) inpaint wire pixels using a patch-based inpainting model and a deep inpainting model in parallel. By employing parallel inpainting techniques, embodiments of the wire inpainting system more efficiently inpaint digital images compared to prior systems, consuming fewer computer resources such as processing power and computing time.

Additional detail regarding the wire inpainting system will now be provided with reference to the figures. For example, FIG. 1 illustrates a schematic diagram of an example system environment for implementing a wire inpainting system 102 in accordance with one or more embodiments. An overview of the wire inpainting system 102 is described in relation to FIG. 1. Thereafter, a more detailed description of the components and processes of the wire inpainting system 102 is provided in relation to the subsequent figures.

As shown, the environment includes server(s) 104, a client device 108, a database 112, and a network 114. Each of the components of the environment communicate via the network 114, and the network 114 is any suitable network over which computing devices communicate. Example networks are discussed in more detail below in relation to FIG. 14.

As mentioned, the environment includes a client device 108. The client device 108 is one of a variety of computing devices, including a smartphone, a tablet, a smart television, a desktop computer, a laptop computer, a virtual reality device, an augmented reality device, or another computing device as described in relation to FIG. 14. The client device 108 communicates with the server(s) 104 via the network 114. For example, the client device 108 provides information to server(s) 104 indicating client device interactions (e.g., digital image selections, inpainting requests, or other input) and receive information from the server(s) 104 such as modified digital images with wires removed or inpainted. Thus, in some cases, the wire inpainting system 102 on the server(s) 104 provides and receives information based on client device interaction via the client device 108.

As shown in FIG. 1, the client device 108 includes a client application 110. In particular, the client application 110 is a web application, a native application installed on the client device 108 (e.g., a mobile application, a desktop application, etc.), or a cloud-based application where all or part of the functionality is performed by the server(s) 104. Based on instructions from the client application 110, the client device 108 presents or displays information to a user, including digital images such as initial (e.g., captured, uploaded, or un-modified) digital images, modified digital images, and/or selectable options for modifying digital images. In some cases, the client application 110 includes all or part of the wire inpainting system 102 and/or the wire inpainting pipeline 116 (e.g., a hybrid wire removal pipeline).

As illustrated in FIG. 1, the environment includes the server(s) 104. The server(s) 104 generates, tracks, stores, processes, receives, and transmits electronic data, such as image inpainting inputs, digital images, and/or modified digital images. For example, the server(s) 104 receives data from the client device 108 in the form of an indication of a client device interaction to inpaint wires in a digital image. In response, the server(s) 104 transmits data to the client device 108 to cause the client device 108 to display or present a modified digital image based on the client device interaction.

In some embodiments, the server(s) 104 communicates with the client device 108 to transmit and/or receive data via the network 114, including client device interactions, image inpainting requests, digital images, and/or other data. In some embodiments, the server(s) 104 comprises a distributed server where the server(s) 104 includes a number of server devices distributed across the network 114 and located in different physical locations. The server(s) 104 comprise a content server, an application server, a communication server, a web-hosting server, a multidimensional server, a container orchestration server, or a machine learning server. The server(s) 104 further access and utilize the database 112 to store and retrieve information such as stored digital images, modified digital images, one or more components of the wire inpainting pipeline 116, and/or other data.

As further shown in FIG. 1, the server(s) 104 also includes the wire inpainting system 102 as part of a digital content editing system 106. For example, in one or more implementations, the digital content editing system 106 is able to store, generate, modify, edit, enhance, provide, distribute, and/or share digital content, such as modified digital images. For example, the digital content editing system 106 provides tools for the client device 108, via the client application 110, to inpaint wires depicted in digital images utilizing the wire inpainting pipeline 116.

In one or more embodiments, the server(s) 104 includes all, or a portion of, the wire inpainting system 102. For example, the wire inpainting system 102 operates on the server(s) to generate and provide modified digital images. In some cases, the wire inpainting system 102 utilizes, locally on the server(s) 104 or from another network location (e.g., the database 112), a wire inpainting pipeline 116 to generate modified digital images. In addition, the wire inpainting system 102 includes or communicates with the wire inpainting pipeline 116.

In certain cases, the client device 108 includes all or part of the wire inpainting system 102. For example, the client device 108 generates, obtains (e.g., downloads), or utilizes one or more aspects of the wire inpainting system 102 from the server(s) 104. Indeed, in some implementations, as illustrated in FIG. 1, the wire inpainting system 102 is located in whole or in part on the client device 108. For example, the wire inpainting system 102 includes a web hosting application that allows the client device 108 to interact with the server(s) 104. To illustrate, in one or more implementations, the client device 108 accesses a web page supported and/or hosted by the server(s) 104.

In one or more embodiments, the client device 108 and the server(s) 104 work together to implement the wire inpainting system 102. For example, in some embodiments, the server(s) 104 train one or more neural networks discussed herein and provide the one or more neural networks to the client device 108 for implementation. In some embodiments, the server(s) 104 trains one or more neural networks, the client device 108 requests image inpainting, and the server(s) 104 generates a modified digital image utilizing the one or more neural networks. Furthermore, in some implementations, the client device 108 assists in training one or more neural networks described herein.

Although FIG. 1 illustrates a particular arrangement of the environment, in some embodiments, the environment has a different arrangement of components and/or may have a different number or set of components altogether. For instance, as mentioned, the wire inpainting system 102 is implemented by (e.g., located entirely or in part on) the client device 108. In addition, in one or more embodiments, the client device 108 communicates directly with the wire inpainting system 102, bypassing the network 114. Further, in some embodiments, the wire inpainting pipeline 116 includes one or more components stored in the database 112, maintained by the server(s) 104, the client device 108, or a third-party device.

Figure 2:
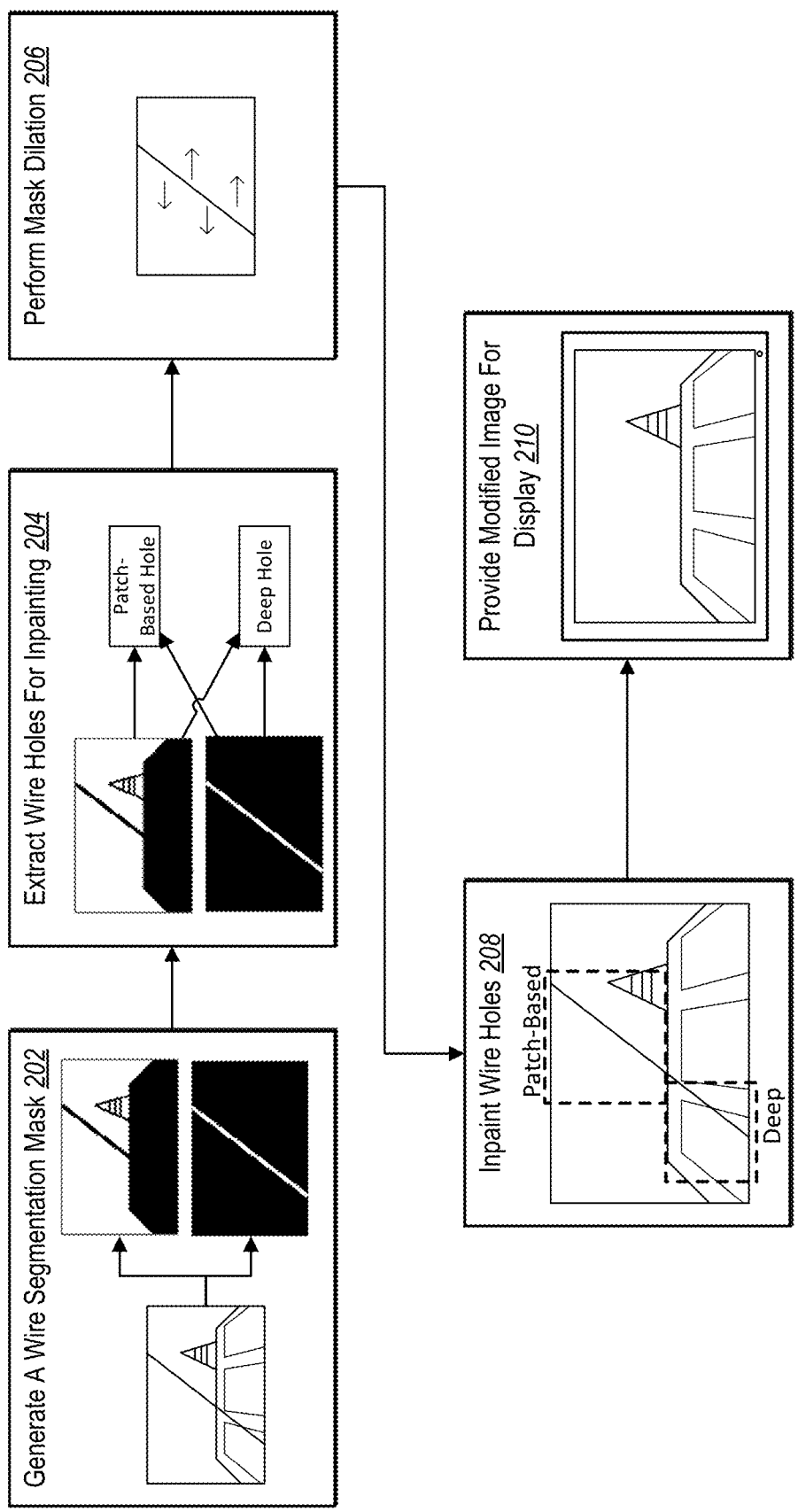
FIG. 2 illustrates an overview of generating a modified digital image utilizing a hybrid wire removal pipeline in accordance with one or more embodiments.

As mentioned, in one or more embodiments, the wire inpainting system 102 generates a modified digital image by inpainting pixels of an initial digital image to remove the appearance of wires, such as telephone wires, data cables, and power lines. In particular, the wire inpainting system 102 utilizes a hybrid wire removal pipeline (e.g., the wire inpainting pipeline 116) to remove wires from a digital image. FIG. 2 illustrates an overview of inpainting a digital image to remove wires in accordance with one or more embodiments. Thereafter, additional detail regarding the various acts illustrated in FIG. 2 is provided in relation to subsequent figures.

As illustrated in FIG. 2, the wire inpainting system 102 performs an act 202 to generate a wire segmentation mask. In particular, the wire inpainting system 102 generates a wire segmentation mask using one or more segmentation models, such as a scene semantic segmentation model and/or a wire segmentation model, to process pixels of a digital image depicting one or more wires. In some embodiments, a wire segmentation mask includes or refers to an image mask (or map) that defines or indicates pixels belonging to particular labels or semantic categories. For instance, a wire segmentation mask indicates wire pixels and non-wire pixels. In some cases, a wire segmentation mask is a binary mask that indicates masked pixels in one color (e.g., white) and unmasked pixels in another color (e.g., black).

To generate a wire segmentation mask, the wire inpainting system 102 segments the digital image to identify and label pixels depicting different objects within the digital image (e.g., e.g., "sky" pixels, "mountain" pixels, or "building" pixels) using the scene semantic segmentation model. The wire inpainting system 102 thus generates a digital image segmentation map (e.g., a scene semantic segmentation map) indicating pixel segments of the digital image designated for inpainting using a first inpainting model (e.g., a patch-based inpainting model). In some cases, the scene semantic segmentation model does not mask pixels depicting objects not indicated or included within a defined set of object labels (e.g., "sky," "mountain," and "building"), such as wire pixels. In one or more embodiments, a digital image segmentation map (or an object map) includes or refers to an image map defining boundaries or edges between pixels corresponding to different labels or semantic categories.

In addition, wire inpainting system 102 identifies and masks pixels depicting wires within the digital image using a wire segmentation model. For example, the wire inpainting system 102 masks wire pixels using a wire segmentation model specifically trained and designed to mask wire pixels, such as a two-stage coarse-to-fine segmentation model including: i) a coarse stage model that captures global contextual information to highlight regions possibly containing wires, and ii) a fine stage model conditioned on the predictions of the coarse stage model to generate high-resolution wire segmentation by processing local patches likely containing wire pixels (as indicated by the coarse stage model). The wire inpainting system 102 thus generates a wire segmentation mask indicating pixels of the digital image designated for inpainting using a second inpainting model (e.g., a deep inpainting model).

As further illustrated in FIG. 2, the wire inpainting system 102 performs an act 204 to extract wire holes for inpainting. For instance, the wire inpainting system 102 extracts wire holes by using a hole separation model based on the digital image segmentation map (from the scene semantic segmentation model) and the wire segmentation mask (from the wire segmentation model). In one or more embodiments, a hole refers to an indicator designating one or more pixels of a digital image for inpainting using replacement pixels. Along these lines, in the same or other embodiments, a wire hole includes or refers to an indicator specifically designating wire pixels (e.g., pixels of a digital image depicting a wire) for inpainting. For example, a wire hole is sometimes indicated or defined using (a portion of) an image mask, such as a wire segmentation mask that delineates between pixels to inpaint (e.g., wire pixels) and pixels not to inpaint.

In some embodiments, the wire inpainting system 102 extracts a first wire hole corresponding to wire pixels overlaid against a natural background. In some embodiments, a natural background includes or refers to pixels surrounding wire pixels (e.g., within a threshold number of pixels of a wire pixel in a direction) or pixels underlying a depicted wire in a digital image, where the natural background pixels depict natural scenery or natural textures (e.g., sky, mountains, or grass). In some cases, natural background pixels satisfy a uniformity threshold such that the pixels are visually consistent in color and/or texture.

In addition, the wire inpainting system 102 extracts a second wire hole corresponding to wire pixels overlaid against a manmade background (e.g., background pixels that do not satisfy a uniformity threshold). In some embodiments, a manmade background includes or refers to pixels surrounding wire pixels (e.g., within a threshold number of pixels of a wire pixel in a direction) or pixels underlying a depicted wire in a digital image, where the manmade background pixels depict manmade scenery or manmade textures (e.g., buildings, roads, or cars). In some cases, natural background pixels do not satisfy a uniformity threshold, meaning that the pixels are less visually consistent in color and/or texture (compared to natural background pixels). As shown, the first hole is indicated by the "Patch-Based Hole" and is designated for processing by a patch-based inpainting model, and the second wire hole is indicated by "Deep Hole" and is designated for processing by a deep inpainting model.

As illustrated in FIG. 2, the wire inpainting system 102 also performs an act 206 to perform mask dilation. More particularly, the wire inpainting system 102 dilates the wire holes and/or portions of the wire segmentation mask corresponding to the wire holes using a mask dilation model. To elaborate, the wire inpainting system 102 dilates pixels along the boundaries of a wire in a variable fashion (e.g., variable-radius dilation or variable-diameter dilation), where the magnitude or amount of dilation for a boundary pixel corresponds to the radius or the diameter of the wire at the location of the boundary pixel. By using such a dilation process, the wire inpainting system 102 accounts for defocus effects and perspective effects that often impact the appearance of wires in a digital image, resulting in more accurate inpainting and wire removal.

As further illustrated in FIG. 2, the wire inpainting system 102 performs an act 208 to inpaint wire holes. More specifically, the wire inpainting system 102 inpaints pixels indicated by the wire holes to fill or replace wire pixels with replacement pixels that resemble those in the background portions of the images around the wire. For instance, the wire inpainting system 102 inpaints wire pixels using a diffusion-based inpainting model and/or a generative-adversarial-network-based ("GAN-based") inpainting model.

To inpaint using a diffusion-based inpainting model, the wire inpainting system 102 utilizes a diffusion neural network to inpaint or remove wire pixels in a digital image. In some cases, a diffusion neural network refers to a type of generative neural network that utilizes a process involving diffusion and denoising to generate a digital image (e.g., an inpainted digital image without wire pixels). For example, the wire inpainting system 102 provides a diffusion neural network with a digital image representation (e.g., a representation of a digital image depicting wires), whereupon the diffusion neural network, through its diffusion layers, adds noise to the digital image representation to generate a noise map or inversion (e.g., a representation of the digital image with added noise). In addition, the wire inpainting system 102 utilizes the architecture of the diffusion neural network (e.g., a plurality of denoising layers that remove noise or recreate a digital image) to generate a digital image (e.g., an inpainted digital image with some or all wire pixels removed) from the noise map/inversion. In some implementations, the diffusion neural network utilizes a conditioning mechanism to condition the denoising layers for adding edits or modifications in generating a digital image from the noise map/inversion. For example, a conditioning mechanism includes a computer-implemented model (e.g., a conditioning encoder that utilizes a neural network encoding architecture) that generates or utilizes feature representations of desired changes or edits that are utilized by denoising layers to generate a modified digital image. In some cases, a conditioning mechanism utilizes a conditioning encoder such as a vision-language machine learning model to generate an encoding that is utilized in denoising layers to generate a modified/inpainted digital image. Thus, conditioning sometimes includes utilizing these feature representations (e.g., concatenating or combining feature representations with representations generated by the denoising layers) with the layers to generate a modified/inpainted digital image. A diffusion neural network encompasses a variety of diffusion architectures, including a deterministic forward diffusion model or denoising diffusion implicit model.

To inpaint using a GAN-based inpainting model, the wire inpainting system 102 uses a generative adversarial neural network to inpaint wire pixels of a digital image. To elaborate, the wire inpainting system 102 utilizes a GAN-based inpainting model to replace wire pixels with non-wire pixels (e.g., to remove the appearance of wires from an image). In some cases, the wire inpainting system 102 generates or trains a GAN-based inpainting model for the task of inpainting wire pixels. Indeed, a generative adversarial neural network ("GAN") refers to a neural network that is tuned or trained via an adversarial process to generate an output digital image from an input such as a noise vector. For example, a generative adversarial neural network includes multiple constituent neural networks such as one or more encoder neural networks and one or more generator (or decoder) neural networks. For example, an encoder neural network extracts latent code from a noise vector or from a digital image (e.g., a digital image depicting wires). A generator neural network (or a combination of generator neural networks) generates a modified digital image (e.g., a digital image with some or all wire pixels removed or inpainted) by combining or otherwise processing extracted latent code (e.g., from the encoder neural network(s)). During training, a discriminator neural network, in competition with the generator neural network, analyzes a generated digital image to generate a realism prediction by determining whether the generated digital image is real (e.g., from a set of stored digital images) or fake (e.g., not from the set of stored digital images). Using one or more loss functions, the discriminator neural network also informs modification of parameters of encoder neural network(s), generator neural network(s), and/or the discriminator neural network to eventually generate digital images that fool the discriminator neural network into indicating that a generated digital image is a real digital image.

In some embodiments, the wire inpainting system 102 inpaints a first wire hole corresponding to natural background pixels using a patch-based inpainting model, and the wire inpainting system 102 inpaints a second wire hole corresponding to manmade background pixels using a deep inpainting model. As shown, the wire inpainting system 102 inpaints two wire holes (along a single wire) using the two different inpainting models, represented by "Patch-Based" and "Deep."

In some embodiments, an inpainting model includes or refers to a machine learning model trained or tuned to inpaint or fill holes of a digital image. For example, an inpainting model fills a hole using replacement pixels that blend with pixels in regions of a digital image surrounding a hole. In some cases, a machine learning model includes or refers to a computer algorithm or a collection of computer algorithms that automatically improve for a particular task through iterative outputs or predictions based on use of data. For example, a machine learning model can utilize one or more learning techniques to improve in accuracy and/or effectiveness. Example machine learning models include various types of neural networks, decision trees, support vector machines, linear regression models, and Bayesian networks.

As just mentioned, in one or more embodiments, the wire inpainting system 102 utilizes a machine learning model in the form of a patch-based inpainting model to inpaint one or more holes of a digital image. For example, a patch-based inpainting model includes or refers to a machine learning model that uses a patch-based approach (e.g., based on image patches or otherwise) to process pixels of a digital image for filling or replacing target pixels (e.g., corresponding to a hole) with replacement pixels. In some embodiments, a patch-based inpainting model includes all or part of the inpainting model described in U.S. Pat. No. 10,762,680, titled GENERATING DETERMINISTIC DIGITAL IMAGE MATCHING PATCHES UTILIZING A PARAL- LEL WAVEFRONT SEARCH APPROACH AND HASHED RANDOM NUMBER, filed Mar. 25, 2019, which is hereby incorporated by reference in its entirety. Alternative patch-based inpainting models are also possible.

In some cases, the wire inpainting system utilizes a machine learning model in the form of a deep inpainting model to inpaint one or more wire holes, where the deep inpainting model is a deep neural network. In one or more embodiments, a neural network refers to a machine learning model that can be trained and/or tuned based on inputs to generate predictions, determine classifications, or approximate unknown functions. For example, a neural network includes a model of interconnected artificial neurons (e.g., organized in layers) that communicate and learn to approximate complex functions and generate outputs (e.g., generated digital images) based on a plurality of inputs provided to the neural network. In some cases, a neural network refers to an algorithm (or set of algorithms) that implements deep learning techniques to model high-level abstractions in data. For example, a neural network can include a deep neural network, a convolutional neural network, a recurrent neural network (e.g., an LSTM), a graph neural network, or a generative adversarial neural network.

In some cases, a deep inpainting model can include or refer to one or more models described in U.S. patent application Ser. No. 17/520,249, titled DIGITAL IMAGE INPAINTING UTILIZING PLANE PANOPTIC SEGMENTATION AND PLANE GROUPING, filed Nov. 5, 2021, which is hereby incorporated by reference in its entirety. In some embodiments, a deep inpainting model includes or refers to a LaMa network as described by Roman Suvorov, Elizaveta Logacheva, Anton Mashikin, Anastasia Remizova, Arsenii Ashukha, Aleksei Silvestrov, Naejin Kong, Harshith Goka, Kiwoong Park, and Victor Lempitsky in *Resolution-Robust Large Mask Inpainting with Fourier Convolutions*, arXiv:2109:07161 (2021).

Additionally, the wire inpainting system 102 performs an act 210 to provide a modified digital image for display. In particular, the wire inpainting system 102 provides a modified digital image for display within an image editing interface presented on the client device 108 (e.g., as part of the client application 110). Indeed, the wire inpainting system 102 provides a modified digital image that does not depict wires and instead depicts replacement pixels (e.g., pixels matching or resembling the background regions) in place of wire pixels shown in an initial digital image before inpainting.

Figure 3:
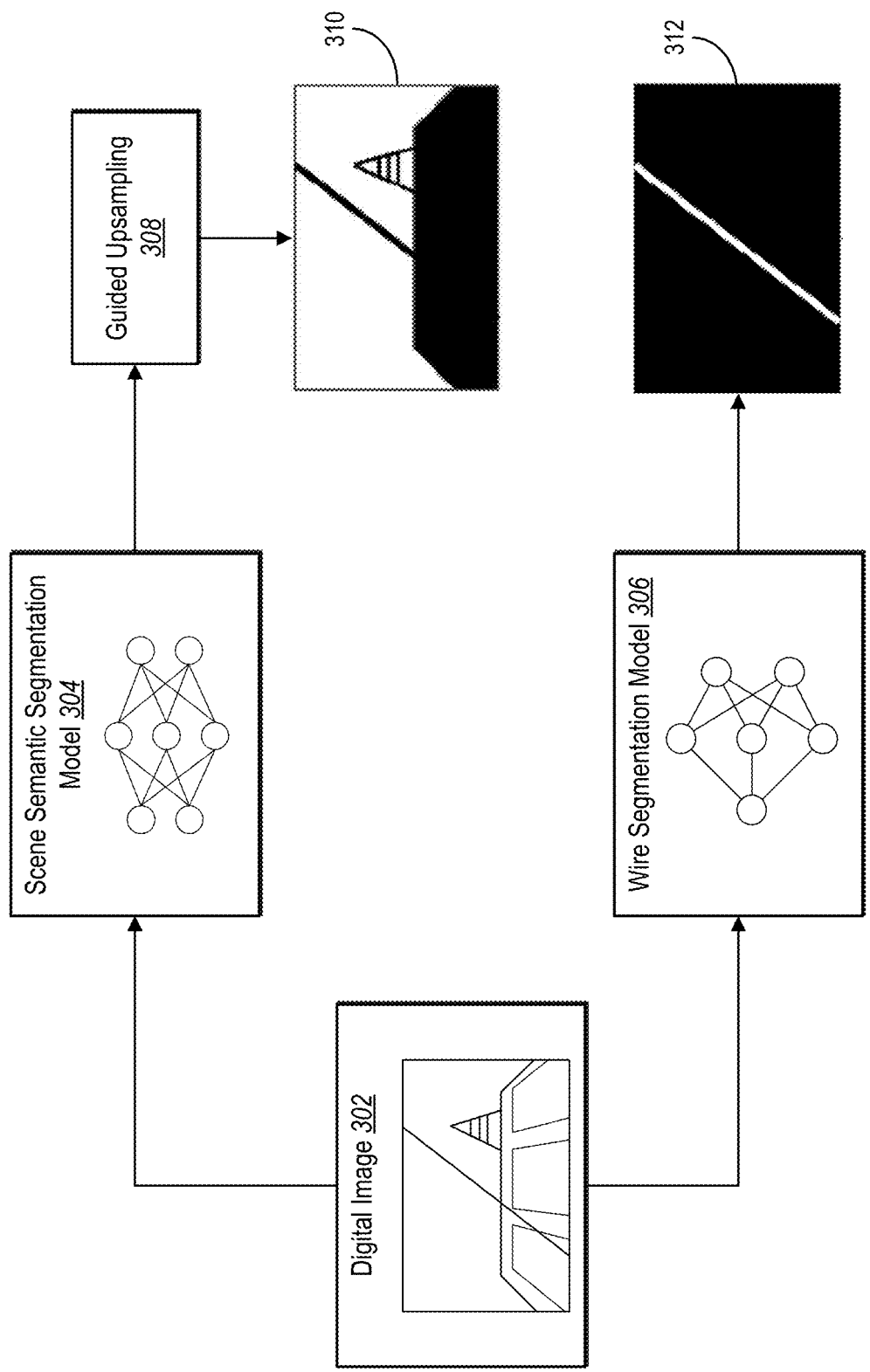
FIG. 3 illustrates an example diagram of generating image segmentations and wire segmentations in accordance with one or more embodiments.

As mentioned above, in certain described embodiments, the wire inpainting system 102 generates a wire segmentation mask to use as a basis for extracting or separating wire holes for inpainting. In particular, the wire inpainting system 102 utilizes a wire segmentation model to generate a wire segmentation mask from a digital image. In addition, the wire inpainting system 102 utilizes a scene semantic segmentation model to generate a digital image segmentation map. FIG. 3 illustrates an example flow diagram for generating a digital image segmentation map and wire segmentation mask in accordance with one or more embodiments.

As illustrated in FIG. 3, the wire inpainting system 102 identifies, receives, or accesses a digital image 302. For example, the wire inpainting system 102 receives a digital image from the client device 108 as an upload or as a newly created image via image editing inputs of the client application 110. As shown, the digital image 302 depicts a perspective view of a building looking up from the ground toward the sky. The digital image 302 also depicts a wire crossing in front of the building, which has a triangular tower on top.

As further illustrated in FIG. 3, the wire inpainting system 102 utilizes a scene semantic segmentation model 304 to generate a digital image segmentation map 310 (which can be referred to as a scene semantic segmentation map). To elaborate, the scene semantic segmentation model 304 processes pixels of the digital image 302 to determine boundaries between different pixel segments, where the boundaries delineate between pixel segments of different labels or semantic categories. In some embodiments, the scene semantic segmentation model 304 is a deep neural network based on Topformer as described by Wenqiang Zhang, Zilong Huang, Guozhong Luo, Tao Chen, Xinggang Wang, Wenyu Liu, and Chunhua Shen in TopFormer: *Token Pyramid Transformer for Mobile Semantic Segmentation*, arXiv:2204.05525 (2022). Accordingly, the scene semantic segmentation model 304 generates predicted probabilities of pixels belonging to seven possible semantic categories: "sky," "water," "plant," "architecture," "natural-ground," "manmade-ground," and "mountain." In one or more embodiments, the wire inpainting system 102 utilizes the following hyper-parameters for the scene semantic segmentation model 304:

inference_size: default 640
use_sigmoid: default True
Radius: default 80
Epsilon: default 0.0001
Scale: default 4.

In certain cases, the scene semantic segmentation model 304 is a deep neural network, such as the scene semantic segmentation neural network described in U.S. patent application Ser. No. 17/520,249 which is incorporated above. In one or more embodiments, a scene semantic segmentation model is a segmentation neural network as described by Yanwei Li, Henghsuang Zhao, Xiaojuan Qi, Liwei Wang, Zeming Li, Jian Sun, and Jiaya Jia in *Fully Convolutional Networks for Panoptic Segmentation*, Proceedings of the IEEE/CVF Conf. on Computer Vision and Pattern Recognition, 214-23 (2021).

In some cases, the scene semantic segmentation model 304 runs inference at a low resolution (e.g., below a resolution threshold), such as a 640×640 pixel resolution. For clear boundary separation between pixel segments, in certain embodiments, the wire inpainting system 102 applies a guided upsampling algorithm 308 to refine the digital image segmentation map 310 at full resolution (e.g., a resolution of the digital image 302, such as 1080p, 4 k, or 8 k). Specifically, the wire inpainting system 102 applies the guided upsampling algorithm 308 to upsample from the low resolution of the direct output from the scene semantic segmentation model 304 (e.g., 640×640) to the higher resolution of the digital image 302.

Accordingly, the wire inpainting system 102 generates the digital image segmentation map 310. As shown, the digital image segmentation map 310 masks pixels corresponding to one or more semantic categories. For instance, the wire inpainting system 102 receives an indication of (or otherwise determines) semantic categories to mask, such as semantic categories corresponding to natural backgrounds including "sky," "mountain," and "plant," from among the seven categories supported by the scene semantic segmentation model 304 (indicated above). As shown, the digital image segmentation map 310 indicates masked pixels in white (e.g., sky pixels) and leaves unmasked pixels in black, including those pixels corresponding to the building, the wire, and the triangular tower.

As further illustrated in FIG. 3, the wire inpainting system 102 utilizes a wire segmentation model 306 to generate a wire segmentation mask 312. For example, the wire inpainting system 102 uses the wire segmentation model 306 in the form of a deep neural network that includes two stages that progress from coarse to fine segmentation. The first stage (e.g., a coarse branch or a global branch) captures global contextual information to highlight regions containing wires. In some cases, the input of the first stage includes five channels: R, G, B, erosion coefficient, and dilation coefficient. In these or other cases, the inference size is 1024 pixels along the long axis.

After the first stage completes, the wire inpainting system 102 utilizes the second stage for tile-based local inference with tile size 1024×1024 pixels and a stride number of 960 (which means that 64 pixels overlap between two adjacent tiles). In some cases, the wire inpainting system 102 utilizes the second stage only when a predicted logit from the first stage falls within a specified range (e.g., between a lower threshold and an upper threshold). The second stage (e.g., a fine branch or a local branch) is conditioned on the predictions of the first stage and generates a high-resolution wire segmentation (e.g., the wire segmentation mask 312) by processing local patches containing wire pixels. Using the two stages, the wire inpainting system 102 thus generates or predicts probabilities of pixels depicting wires (e.g., binarized using a threshold of 0.3 by default). As shown, the wire segmentation mask 312 indicates masked wire pixels in white and unmasked pixels in black.

In some cases, the wire segmentation model 306 includes all or part of a ResNet-50 model as described by Kaiming He, Xiangyu Zhang, Shaoqing Ren, and Jian Sun in *Deep Residual Learn for Image Recognition*, Proceedings of IEEE Conf. on Comp. Vision and Pattern Recognition, pp. 770-78 (2016) and/or a MixTransformer-B2 model as described by Enze Xie, Wenhai Wang, Zhiding Yu, Anima Anandkumar, Jose M. Alvarez, and Ping Luo in *Segformer: Simple and Effective Design for Semantic Segmentation with Transformers*, arXiv:2105.15203 (2021). In one or more embodiments, the wire segmentation model 306 utilizes the following hyper-parameters:

Global_size: default 1024
Local_size: Crop size for local refinement, default 1024
Stride: default 960 for 64 tile/crop overlap
Refine_threshold: range to run refinement, default (0.0001, 1.0)
Min_max_kernel: default 6
Interpolation: default bilinear
Thres: binarization thresholds, default 0.3.

Figure 4:
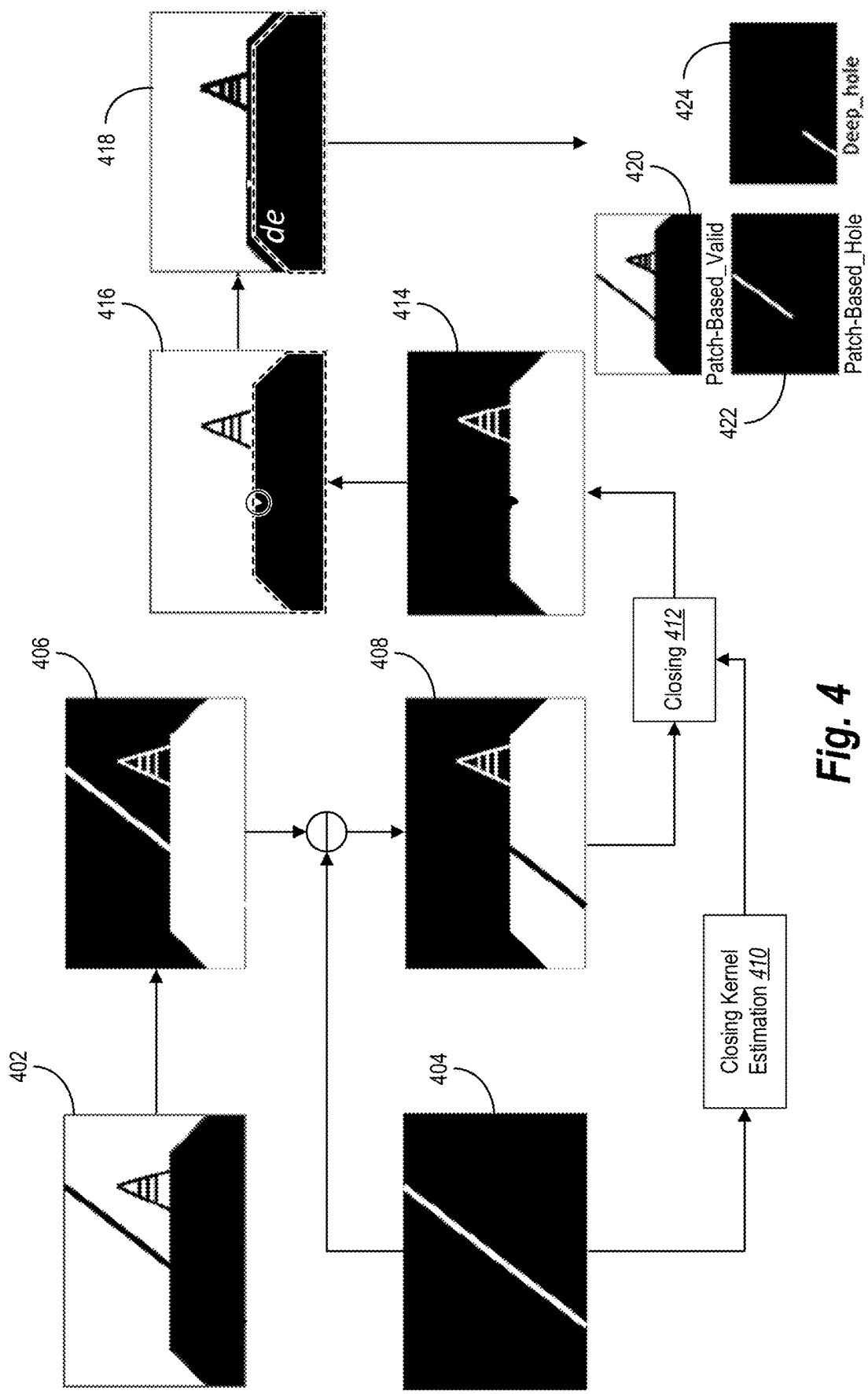
FIG. 4 illustrates an example diagram for extracting wire holes from image segmentations in accordance with one or more embodiments.

As mentioned above, in certain described embodiments, the wire inpainting system 102 extracts wire holes from a wire segmentation mask and/or a digital image segmentation map. In particular, the wire inpainting system 102 utilizes a hole separation model to separate or extract wire holes and valid masks for processing by inpainting models. FIG. 4 illustrates a process implemented by a hole separation model for extracting wire holes from a wire segmentation mask and or a digital image segmentation map.

As illustrated in FIG. 4, the wire inpainting system 102 generates an inverted segmentation map 406 from the digital image segmentation map 402 (e.g., the digital image segmentation map 310). More specifically, the wire inpainting system 102 inverts the digital image segmentation map 402 by unmasking natural pixels (e.g., changing them to black) and masking manmade pixels (e.g., changing them to white).

By inverting the segmentation map before combining with the wire segmentation mask 404, the wire inpainting system 102 avoids issues of mistakenly inpainting thin lines corresponding to tower pixels or other thin structures that might resemble wires.

Indeed, as shown in FIG. 4, the wire inpainting system 102 combines the wire segmentation mask 404 with the inverted segmentation map 406. More specifically, the wire inpainting system 102 subtracts the wire pixel regions indicated by the wire segmentation mask 404 from the inverted segmentation map 406. Accordingly, the wire inpainting system 102 generates an inverted wire-free segmentation map 408 that indicates masked pixels (in white) for manmade regions other than the wire and unmasked pixels for natural regions and the wire.

As further illustrated in FIG. 4, the wire inpainting system 102 performs a closing operation 412. Indeed, the wire inpainting system 102 uses the closing operation 412 to close or fills a portion of the inverted wire-free segmentation map 408. Specifically, the wire inpainting system 102 fills or masks holes indicated unmasked pixels (in black) within regions of masked pixels (in white). To perform the closing operation 412, the wire inpainting system 102 also performs a closing kernel estimation 410 to estimate an erosion rate (e.g., a kernel size) by iteratively eroding the inverted wire-free segmentation map 408 (or portions corresponding to the wire segmentation mask 404) to identify an erosion rate where the (unmasked) wire region disappears (or at least a threshold percentage is removed or less than a threshold percentage remains). As shown, the wire inpainting system 102 thus generates a closed inverted segmentation map 414 by filling (or masking) the black wire portion extending into the masked white building region, replacing the black unmasked pixel indicators with white masked pixel indicators.

As shown, the wire inpainting system 102 further inverts the closed inverted segmentation map 414 to re-mask natural background pixels and unmask manmade background pixels. Accordingly, the wire inpainting system 102 generates a closed segmentation map 416 as a result of the re-inverting. In certain embodiments, small gaps or defects sometimes remain along the boundary between masked and unmasked pixels in the closed segmentation map 416 (e.g., as indicated by the circled imperfection along the top border of the masked building pixels).

To avoid inpainting artifacts that sometimes result from such masking defects, the wire inpainting system 102 erodes the closed segmentation map 416 according to an erosion coefficient de. For instance, the wire inpainting system 102 determines a value or a magnitude for de such that the boundary defects between unmasked pixels are removed or resolved (or reduced by a threshold percentage). In some cases, the wire inpainting system 102 further prevents selecting de values that exceed a threshold magnitude to prevent color artifacts that sometimes result from deep inpainting with large de values. By eroding the closed segmentation map 416, the wire inpainting system 102 generates a hole selection mask 418 from which to select or extract wire holes for inpainting.

As further illustrated in FIG. 4, the wire inpainting system 102 selects or extracts a first wire hole 422 (e.g., the "Patch-Based_hole") and a second wire hole 424 (e.g., the "Deep_hole") from the hole selection mask 418. More specifically, the wire inpainting system 102 extracts the first wire hole 422 by combining (e.g., multiplying) the hole selection mask 418 with the wire segmentation mask 404. The wire inpainting system 102 extracts the second wire hole 424 by inverting the hole selection mask 418 and combining (e.g., multiplying) the inverted hole selection mask with the wire segmentation mask 404. Further, the wire inpainting system 102 generates a patch-based valid map 420 (e.g., the "Patch-Based_Valid" map), which is used as input into a patch-based inpainting model, by subtracting the hole selection mask 418 from the wire segmentation mask 404 (or by subtracting the wire segmentation mask 404 from the hole selection mask 418).

In certain embodiments, the wire inpainting system 102 utilizes a hole separation model to generate the first wire hole 422 and the second wire hole 424 as described. For example, the hole separation model generates an output including: a Patch-Based_hole, a Patch-Based_valid map, a Deep_hole, and a Seg_Maks (e.g., a binary segmentation mask without wire regions). In certain cases, the only input for the hole separation model is de, the erosion coefficient.

In one or more embodiments, one or more of the processes illustrated in FIG. 4 are run in parallel. For example, the wire inpainting system 102 generates the digital image segmentation map 402 and the wire segmentation mask 404 in parallel. As another example, the wire inpainting system 102 generates the first wire hole 422, the second wire hole 424, and/or the patch-based valid map 420 in parallel.

Figure 5:
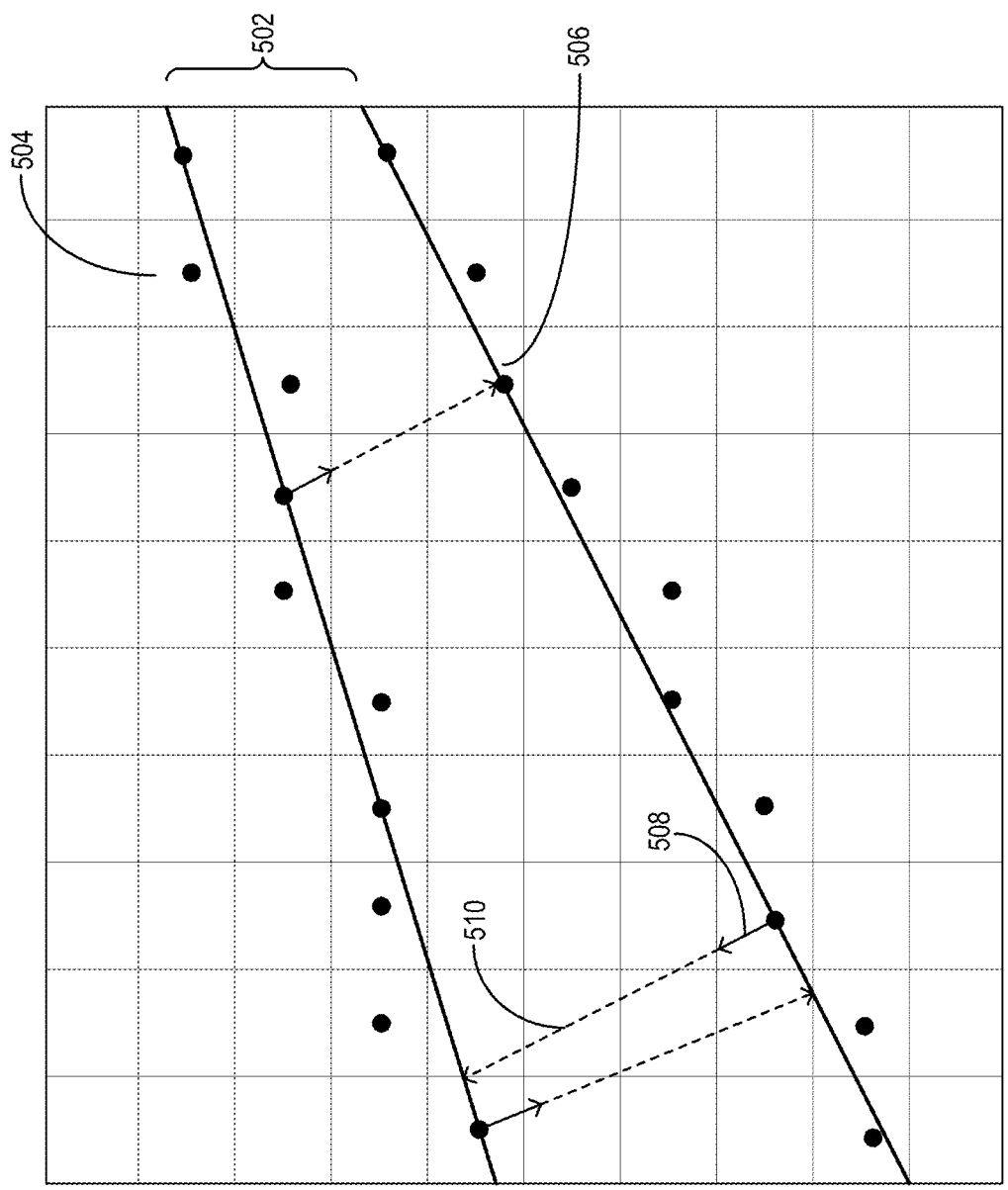
FIG. 5 illustrates an example diagram for dilating wire pixels in accordance with one or more embodiments.

As mentioned above, in certain described embodiments, the wire inpainting system 102 utilizes a mask dilation model to dilate wire pixels for more accurate inpainting. In particular, the wire inpainting system 102 identifies wire pixels along a boundary of a wire and performs a dilation process to dilate the pixels for more accurate removal of wire pixels. FIG. 5 illustrates an example wire dilation process implemented by a mask dilation model in accordance with one or more embodiments.

As illustrated in FIG. 5, the wire inpainting system 102 dilates wire pixels depicting a wire 502, where a pixel is represented by a box within the depicted grid. As shown, the diameter or radius of the wire 502 changes throughout the grid, which is the result of perspective effects of a camera that makes closer portions of a wire look wider and farther portions of a wire look thinner. Indeed, as mentioned above, the wire inpainting system 102 performs dilation to alleviate or reduce perspective effects that change the perceived diameter of a wire throughout a digital image as well as defocus effects that blur edges or boundaries of wires.

To dilate the wire 502, the wire inpainting system 102 utilizes a mask dilation model to generate a dilated binary mask from a binary mask (or a probability map), such as a wire segmentation mask or a wire hole. For instance, the mask dilation model generates a dilated wire hole from a wire hole extracted from a hole selection mask. In some embodiments, the wire inpainting system 102 determines or computes an overall diameter D' of the wire 502 at each pixel location within a wire mask or a wire hole. The wire inpainting system 102 further determines a corresponding per-pixel dilation for each boundary pixel along the edge of the wire 502, including the boundary pixel 504 and the boundary pixel 506.

In one or more embodiments, the wire inpainting system 102 performs the dilation process in two steps: 1) determining the diameter of each pixel along the boundary of the wire 502 and 2) dilating the boundary pixels of the wire. To determine the diameter of a boundary pixel, such as boundary pixel 504, the wire inpainting system 102 uses a thresholding technique to generate a binary image (e.g., a wire segmentation mask) that indicates wire pixels and non-wire pixels. In addition, the wire inpainting system 102 determines boundary pixels by identifying wire pixels that have at least one adjacent (e.g., neighboring) non-wire pixel. As shown, the wire inpainting system 102 identifies the boundary pixel 504 and the boundary pixel 506 as wire pixels that are adjacent to at least one non-wire pixel.

In one or more embodiments, the wire inpainting system 102 further determines a normalized gradient direction for each boundary pixel. For instance, the wire inpainting system 102 generates a distance transform of the binary wire image (e.g., the image segmentation mask) and then determining a negative gradient of the distance transform after normalization (e.g., by dividing by the length of the gradient vector). In some cases, the wire inpainting system 102 determines the gradient of the initial digital image that depicts the wire against a natural and/or manmade background. As shown, the wire inpainting system 102 determines a normalized gradient 508, as indicated by the first portion of the arrow extending from a boundary pixel (e.g., the short solid portion before the longer dashed portion). The wire inpainting system 102 likewise determines gradients for the other boundary pixels as well.

As further illustrated in FIG. 5, the wire inpainting system 102 generates (or casts) a ray for each boundary pixel in the gradient direction. As shown, the ray 510 is the dashed portion of the arrow extending from the boundary pixel in the gradient direction. The wire inpainting system 102 further determines a distance (e.g., in pixels) of the ray before meeting or exiting the opposite side of the wire 502. In some cases, the wire inpainting system 102 uses a predefined maximum distance (e.g., 150 pixels) because wires are usually only so large within a digital image.

In one or more embodiments, the wire inpainting system 102 smooths the diameter of the wire 502. In particular, the wire inpainting system 102 generates and uses two two-dimensional maps: D and B, where D is the diameter of each pixel if it is a boundary pixel and zero otherwise, and B has a value of one if the pixel is a boundary pixel and zero otherwise. In some embodiments, the wire inpainting system 102 determines or computes a smoothed diameter D' using a smoothing operation given by:

$$D' = \frac{(D * G)}{(B * G + \varepsilon)}$$

where * represents a convolution operation, G is a Gaussian blur kernel, ε is a constant (e.g., a small value) to prevent division by zero, and the division operation is element-wise division.

Based on determining or generating the smoothed diameter D', the wire inpainting system 102 determines a dilation amount for each wire pixel (or for each wire boundary pixel). For example, the wire inpainting system 102 determines a per-pixel dilation for a wire pixel or a boundary pixel according to:

$$d = \text{floor}(ra \times D' + aa)$$

where d is a pixel diameter, ra and aa are hyperparameters, and where floor(x) is a floor operation or a floor function. In some embodiments, the wire inpainting system 102 sets ra=0.25 and aa=2.5. Using this dilation calculation, if ra=0, then the formula degrades to uniform dilation decided by aa, but in real scenarios ra is non-zero and the dilation increases with the diameter of the wire 502. Accordingly, the wire inpainting system 102 determines a first dilation amount for the boundary pixel 504 that is less than a second dilation amount for the boundary pixel 506 where the diameter is larger.

In some embodiments, the wire inpainting system 102 dilates the wire 502 using the per-pixel varying dilation d for uniform image dilation (e.g., using a square kernel). Specifically, the wire inpainting system 102 generates a list of integers i within the diameter map d and, for each integer, determines a mask m_i where d==i. The wire inpainting system 102 thus applies the dilation to pixels of the wire 502 according to:

$$\text{dilate}(I \odot m\_i, i)$$

where I is the threshold wire segmentation mask and $\odot$ represents the element-wise (or Hadamard) product, and where dilate (A, i) computes a uniform dilation by i pixels (where the dilation is the same for all pixels). In some cases, the wire inpainting system 102 further determines a pixel-wise maximum of all I_i as a final result or a final dilation value to apply to boundary pixels.

Using the dilation described, the wire inpainting system 102 thus dilates pixels of one or more wire holes for more accurate identification of wire pixels to inpaint with background pixels. Indeed, the wire inpainting system 102 uses a mask dilation model to dilate wire pixels indicated by wire holes. In some cases, the mask dilation model uses the following hyperparameters:

ra: the multiplier to the wire radius, zero to degrade to uniform dilation aa: the offset added to the dilation rate Threshold: binarization threshold.

Using these hyperparameters, the mask dilation model generates an output in the form of a dilated binary mask (e.g., one or more dilated wire holes) from one or more probability maps or binary maps (e.g., wire holes).

Figure 6:
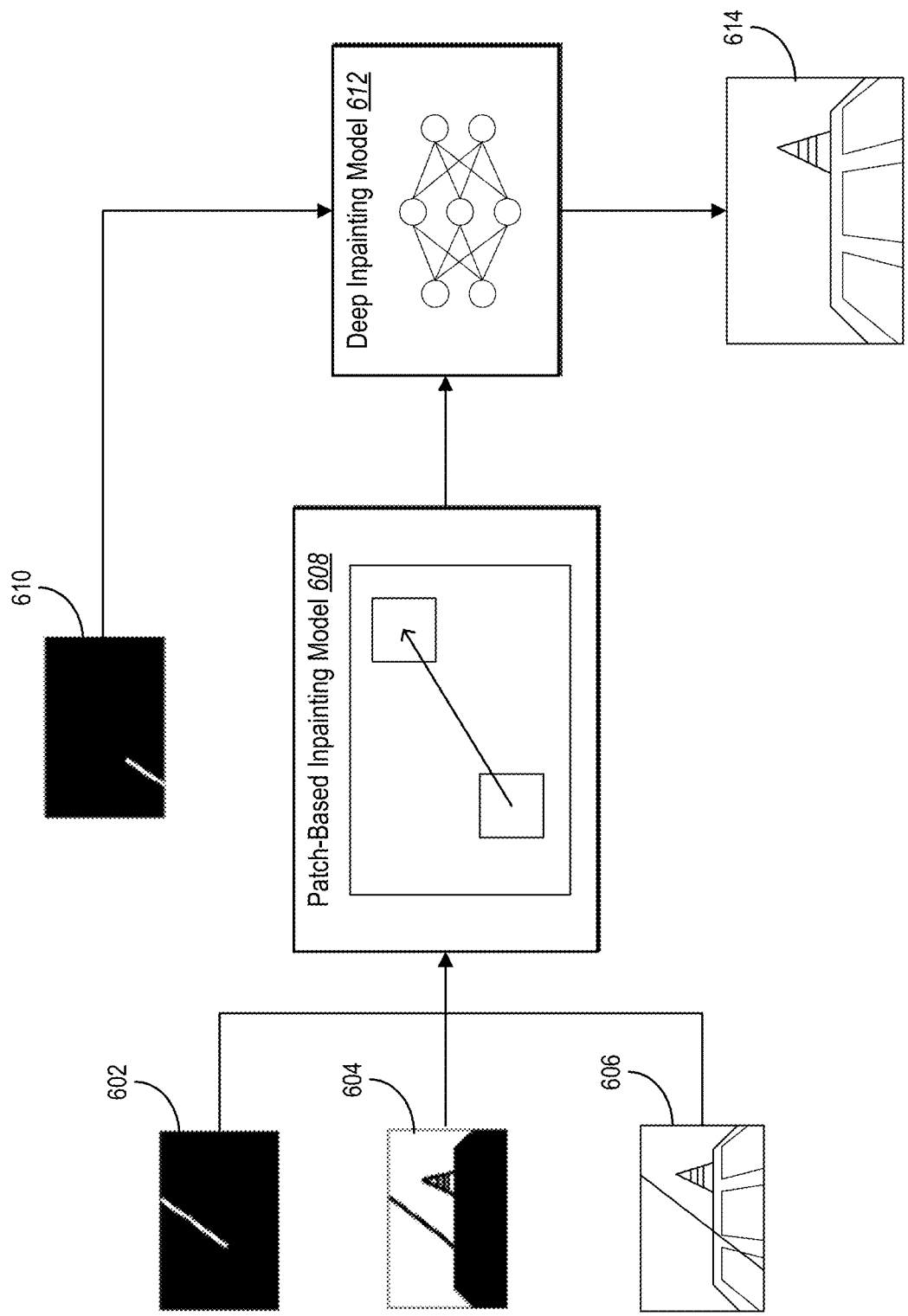
FIG. 6 illustrates an example diagram for inpainting wire pixels using different inpainting models in accordance with one or more embodiments.

As mentioned above, in certain described embodiments, the wire inpainting system 102 inpaints wire pixels of a digital image to remove wires. In particular, the wire inpainting system 102 inpaints wire pixels indicated by wire holes (e.g., dilated wire holes) using one or more inpainting models, such as a patch-based inpainting model and a deep inpainting model. FIG. 6 illustrates an example process for inpainting wire pixels using a patch-based inpainting model and a deep inpainting model in accordance with one or more embodiments.

As illustrated in FIG. 6, the wire inpainting system 102 uses a patch-based inpainting model 608 to inpaint wire pixels of a digital image 606. In particular, the wire inpainting system 102 inpaints wire pixels indicated by the wire hole 602 (e.g., the first wire hole 422) and the valid map 604 (e.g., the patch-based valid map 420). For example, the wire inpainting system 102 uses the patch-based inpainting model 608 to inpaint wire pixels overlaid against natural background pixels, as indicated by the wire hole 602. In some cases, the patch-based inpainting model 608 identifies pixels (e.g., patches), such as natural background pixels, within the digital image 606 to use as replacement pixels for wire pixels indicated by the wire hole 602.

In some embodiments, the wire inpainting system 102 generates an intermediate digital image using the patch-based inpainting model 608 by inpainting the wire pixels of the digital image 606. Indeed, the patch-based inpainting model 608 generates an intermediate digital image as output after inpainting wire pixels overlaid on natural background pixels. The wire inpainting system 102 further inputs the intermediate digital image into the deep inpainting model 612 for further inpainting.

Indeed, as shown, the wire inpainting system 102 utilizes a deep inpainting model 612 to inpaint wire pixels of the digital image 606. More specifically, the wire inpainting system 102 uses the deep inpainting model 612 to inpaint wire pixels indicated by the wire hole 610 (e.g., the second wire hole 424). For example, the deep inpainting model 612 inpaints wire pixels overlaid against manmade background pixels, as indicated by the wire hole 610. As shown, the wire inpainting system 102 uses the patch-based inpainting model 608 and the deep inpainting model 612 in series, first inpainting wire pixels of the wire hole 602 against natural backgrounds and then inpainting wire pixels of the wire hole 610 against manmade backgrounds. In some cases, using the patch-based inpainting model 608 before the deep inpainting model 612 helps remove boundary artifacts where transitions or intersections occur between natural and manmade backgrounds. The wire inpainting system 102 thus generates the modified digital image 614 by inpainting the wire pixels of the digital image 606, removing the appearance of the wire.

In some cases, the deep inpainting model 612 includes Fourier convolutional layers for efficient, high-quality structure completion (e.g., to complete buildings and other manmade backgrounds). To address color inconsistency, the deep inpainting model 612 uses an onion-peel color adjustment module. Specifically, the wire inpainting system 102 determines the mean of the RGB channels within onion-peel regions of a wire mask M, where the onion-peel regions are defined by:

$$M_o = D(M, d) - M$$

where $M_0$ is an onion-peel region, M is the wire mask, D represents the binary dilation operator, and d is the kernel size. The wire inpainting system 102 determines the color difference for each channel c ∈ R, G, B according to the following equation:

$$\text{Bias}_c = \mathbb{E}[M_o(x_c - y_c)]$$

where x is the input image and y is the modified digital image from the deep inpainting model 612. In some cases, the final output of the deep inpainting model is:

$$\hat{y}_c = y_c + \text{Bias}_c$$

and the wire inpainting system 102 applies loss functions to $\hat{y}_c$ to achieve color consistency while compositing the final result:

$$y_{out} = (1 - M) \odot x + M \odot \hat{y}.$$

In some embodiments, the wire inpainting system 102 implements the patch-based inpainting model 608 and the deep inpainting model 612 in parallel. To elaborate, the wire inpainting system 102 identifies and filters out intersection wire pixels where natural backgrounds transition to manmade backgrounds (or vice-versa). The wire inpainting system 102 further runs the patch-based inpainting model 608 on wire pixels overlaid on natural backgrounds in parallel with the deep inpainting model 612 on pixels overlaid on manmade backgrounds, leaving the intersection wire pixels for last. In some cases, the wire inpainting system 102 first runs the patch-based inpainting model 608 on intersection wire pixels before applying the deep inpainting model 612 to resolve boundaries and remove artifacts.

Figure 7:
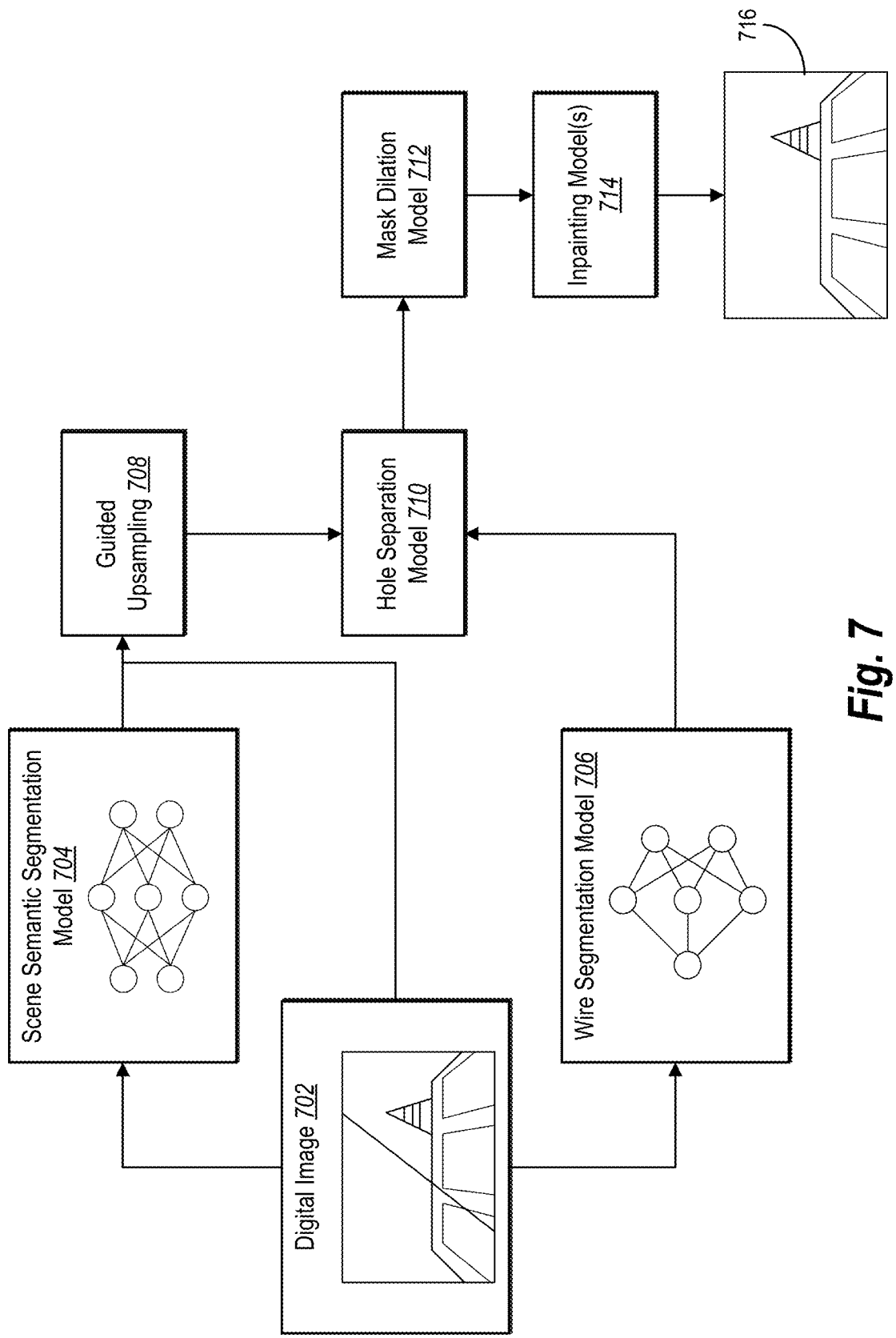
FIG. 7 illustrates an example diagram of a hybrid wire removal pipeline in accordance with one or more embodiments.

As mentioned above, in certain embodiments, the wire inpainting system 102 utilizes a hybrid wire removal pipeline to inpaint wire pixels of a digital image. In particular, the wire inpainting system 102 uses a hybrid wire removal pipeline that includes various models, including a scene semantic segmentation model, a wire segmentation model, a hole separation model, a mask dilation model, a patch-based inpainting model, and/or a deep inpainting model. FIG. 7 illustrates an example hybrid wire removal pipeline (e.g., the wire inpainting pipeline 116) in accordance with one or more embodiments. The description of FIG. 7 provides a high-level review of concepts described above, tying them together in a single image for the entire pipeline.

As illustrated in FIG. 7, the wire inpainting system 102 uses a scene semantic segmentation model 704 and a wire segmentation model 706 to process a digital image 702. Specifically, the scene semantic segmentation model 704 generates a digital image segmentation map, and the wire segmentation model 706 generates a wire segmentation mask from the digital image 702. In addition, the wire inpainting system 102 applies guided upsampling 708 to the digital image segmentation map to obtain a higher resolution (e.g., a full resolution of the digital image 702).

As further illustrated in FIG. 7, the wire inpainting system 102 utilizes a hole separation model 710 to extract wire holes from the wire segmentation mask and the digital image segmentation map. For example, the hole separation model 710 extracts a first wire hole corresponding to wire pixels overlaid against a natural background, where the first wire hole is designated for inpainting using a patch-based inpainting model. In addition, the hole separation model 710 extracts a second wire hole corresponding to wire pixels overlaid against a manmade background, where the second wire hole is designated for inpainting using a deep inpainting model.

Additionally, the wire inpainting system 102 utilizes a mask dilation model 712 to dilate the wire holes (or corresponding portions of segmentation masks) as described above. Indeed, the mask dilation model 712 dilates boundary pixels for wires according to relative wire diameter. Further, the wire inpainting system 102 utilizes the inpainting model(s) 714 to inpaint wire pixels indicated by the dilated wire holes, thus generating the modified digital image 716 with the wire removed.

Figure 8:
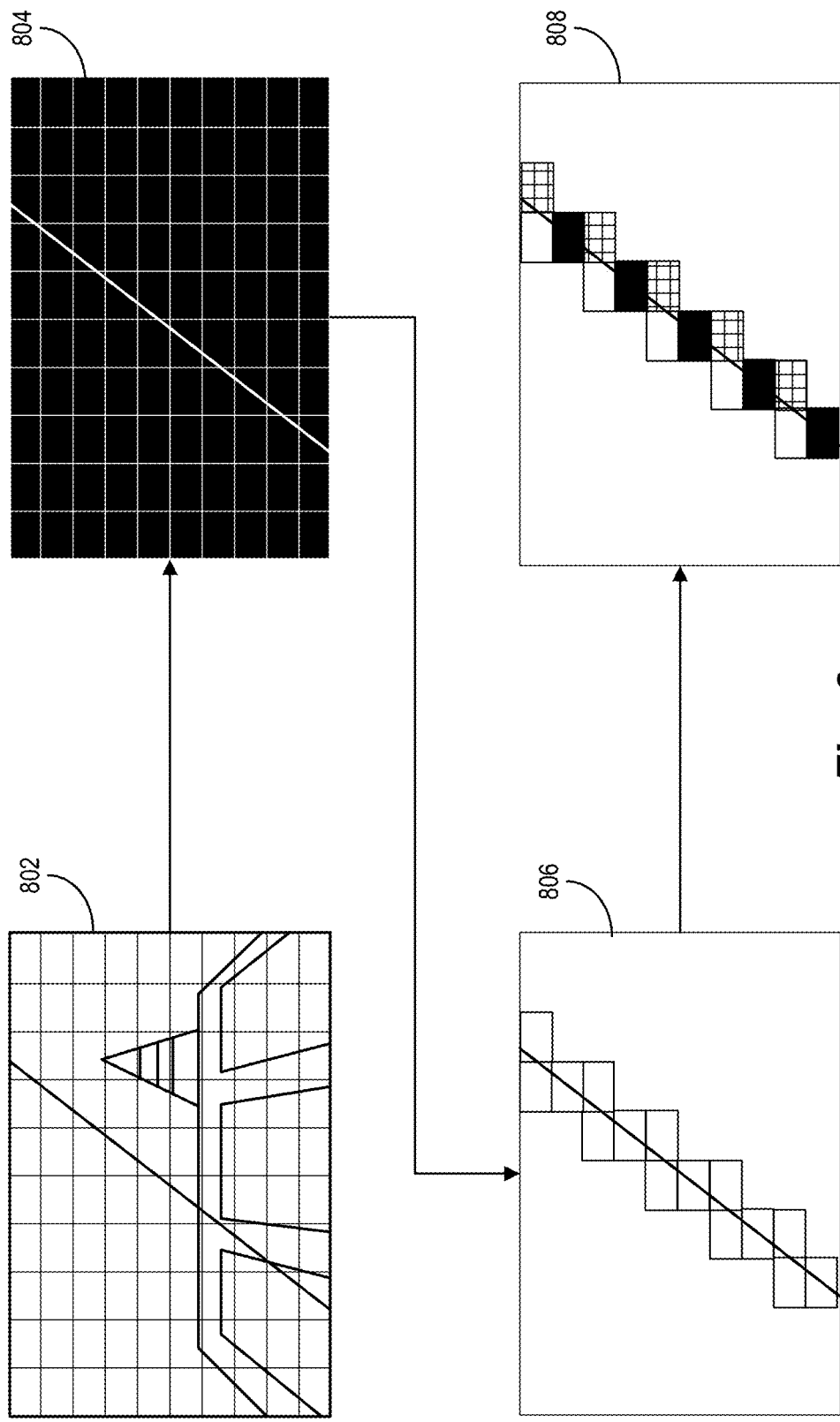
FIG. 8 illustrates an example diagram for parallel inpainting using a deep inpainting model in accordance with one or more embodiments.

As mentioned above, in certain described embodiments, the wire inpainting system 102 utilizes a deep inpainting model to inpaint one or more wire holes as part of removing wires from a digital image. In particular, the deep inpainting model uses a tile-based inpainting process to inpaint pixel tiles. In some cases, the wire inpainting system 102 uses a parallel batching technique to inpaint pixel tiles in parallel using the deep inpainting model. FIG. 8 illustrates an example parallel batching technique in accordance with one or more embodiments.

As illustrated in FIG. 8, the wire inpainting system 102 generates a tile grid 802 for a digital image. To elaborate, wire inpainting system 102 segments or divides a digital image into a grid of pixel tiles, where each tile in the tile grid 802 has a particular size or resolution. For example, the wire inpainting system 102 generate the tile grid 802 to consist of 512×512 pixel tiles. In some cases, the wire inpainting system 102 further generates the tile grid such that adjacent (e.g., neighboring) tiles overlap by a certain (e.g., no more than a threshold) number of pixels (e.g., 32 pixels).

As further illustrated in FIG. 8, the wire inpainting system 102 generates a masked grid 804. More specifically, the wire inpainting system 102 generates the masked grid 804 (e.g., from the tile grid 802) as a grid of pixel tiles corresponding to a wire segmentation mask. In addition, the wire inpainting system 102 searches the masked grid 804 to identify tiles that contain wire masks (e.g., those tiles where the white masked wire passes through). Indeed, the wire inpainting system 102 identifies masked wire tiles as indicated in box 806 that includes only the tiles containing wire pixels.

Additionally, the wire inpainting system 102 performs parallel inpainting by applying the deep inpainting model to nonoverlapping (or partially overlapping) tiles in parallel. To elaborate, as shown in the batching 808, the wire inpainting system 102 batches non-overlapping (or partially overlapping) tiles together such that pixel tiles in the same batch do not overlap (or overlap by less than a threshold number of pixels) with one another. As shown, the wire inpainting system 102 generates three batches of non-overlapping (or partially overlapping) pixels, as indicated by the pixel tiles of different patterns. The wire inpainting system 102 further applies the deep inpainting model to inpaint pixels tiles of a given batch in parallel. The wire inpainting system 102 can thus inpaint pixel tiles of each batch in turn until the tiles containing wire pixels are all inpainted.

Figure 9:
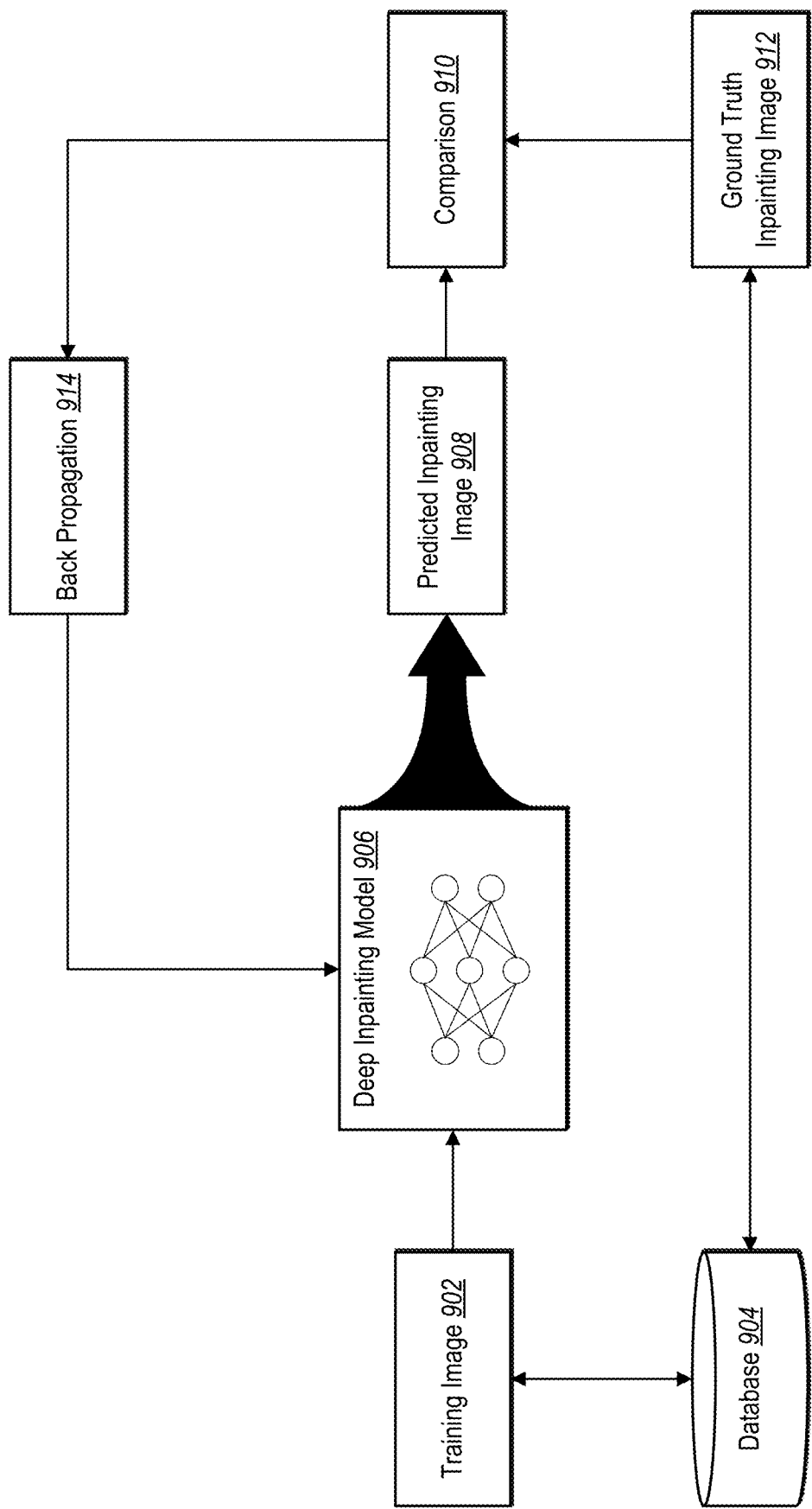
FIG. 9 illustrates an example diagram for training a deep inpainting model in accordance with one or more embodiments.

As mentioned above, in certain described embodiments, the wire inpainting system 102 trains one or more models to perform their respective tasks within the hybrid wire removal pipeline. In particular, the wire inpainting system 102 trains a deep inpainting model to inpaint wire pixels of a digital image to remove the appearance of a wire, specifically for wire pixels adjacent to manmade background pixels. FIG. 9 illustrates an example training process for a deep inpainting model in accordance with one or more embodiments. In some cases, the wire inpainting system 102 trains other models, especially deep models, using a similar process.

To better address wire-like shapes for inpainting and resolve color consistency issues, the wire inpainting system 102 tailors the training of the deep inpainting model 906 (e.g., the deep inpainting model 612) for wire inpainting. Specifically, the wire inpainting system 102 fine-tunes the Big-LaMa model (mentioned above) on 512×512 pixel images for consistency with real inference settings. In addition, the wire inpainting system 102 generates a training mask type by balancing rectangles, free strokes, and wire-shaped holes in a ratio of 1:1:1. Further, the wire inpainting system 102 applies the color consistency adjustment module (e.g., a component within the deep inpainting model 906) to extract average color difference values around a hole boundary, and to add such values back to predicted results. In some cases, the wire inpainting system 102 trains the deep inpainting model 906 using reconstruction loss on predicted images instead of on composite inpainted images. Additional detail for the training process is provided hereafter.

As illustrated in FIG. 9, the wire inpainting system 102 performs an iterative training process to improve the accuracy of the deep inpainting model 906. For example, the wire inpainting system 102 retrieves or accesses a training image 902 from a database 904 (e.g., the database 112). In some cases, the database 904 stores a training dataset that includes randomly cropped 680×680 pixel images depicting non-wire regions and/or images at 512×512 pixels with synthetic wire masks. In addition, the wire inpainting system 102 inputs the training image 902 into the deep inpainting model 906. In turn, the deep inpainting model 906 generates a predicted inpainting image 908 from the training image 902 (e.g., by inpainting wires according to internal model parameters).

As further illustrated in FIG. 9, the wire inpainting system 102 also performs a comparison 910 between the predicted inpainting image 908 and a ground truth inpainting image 912. To elaborate, the wire inpainting system 102 accesses or retrieves a ground truth inpainting image 912 from the database 904, where the ground truth inpainting image 912 corresponds to, or depicts the actual inpainted version of, the training image 902. Thus, the wire inpainting system 102 compares the ground truth inpainting image 912 with the predicted inpainting image 908.

To perform the comparison 910, in some embodiments, the wire inpainting system 102 utilizes a loss function such as an L1 reconstruction loss, a perceptual loss, and/or a GAN adversarial loss to determine a measure of loss between the predicted inpainting image 908 and the ground truth inpainting image 912. Based on the comparison 910, the wire inpainting system 102 further performs a back propagation 914. In particular, the wire inpainting system 102 back propagates to modify internal parameters of the deep inpainting model 906, such as weights and biases corresponding to internal layers and neurons of the model. By modifying the weights and biases, the wire inpainting system 102 adjusts how the deep inpainting model 906 processes and passes information to reduce a measure of loss determined via the comparison 910 for subsequent iterations.

Indeed, the wire inpainting system 102 repeats the process illustrated in FIG. 9 for multiple iterations or epochs and/or until the deep inpainting model 906 generates a predicted inpainting image that satisfies a threshold measure of loss (or a threshold accuracy). For instance, for each iteration, the wire inpainting system 102: i) accesses a training image, ii) utilizes the deep inpainting model 906 to generate a predicted inpainting image from the training image, iii) compares (via a loss function) the predicted inpainting image with a corresponding ground truth inpainting image, and iv) back propagates to reduce the measure of loss by modifying parameters of the deep inpainting model 906. By utilizing the iterative training process, the wire inpainting system 102 generates accurate inpainted images.

Figure 10:
FIG. 10 illustrates an example table of experimental results in accordance with one or more embodiments.
Figure 11:
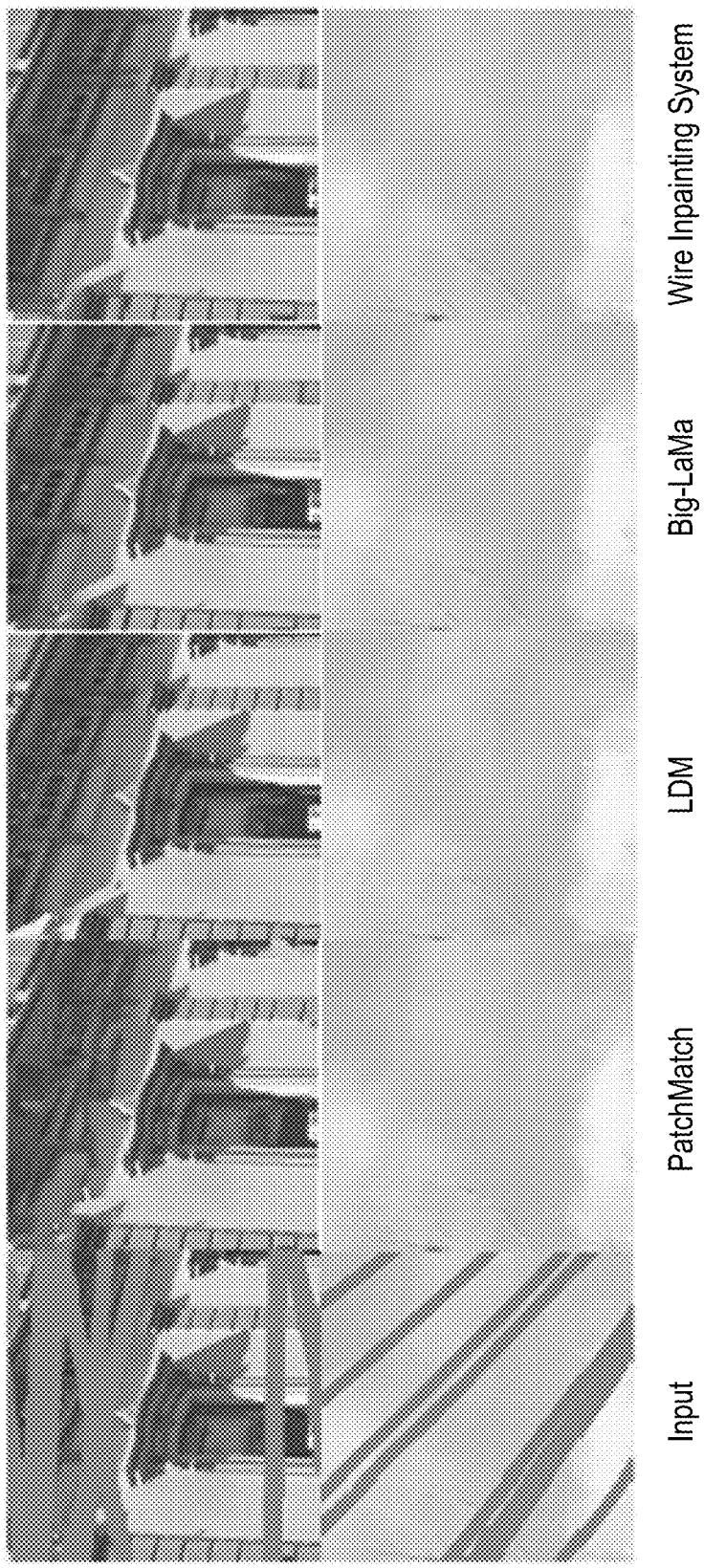
FIG. 11 illustrates an example comparison of inpainted digital images for various models in accordance with one or more embodiments.

As mentioned above, in certain embodiments, the wire inpainting system 102 provides improvements over prior systems. In particular, the wire inpainting system 102 more accurately inpaints digital images to remove wires when compared to existing inpainting systems. FIGS. 10-11 illustrate improvements of the wire inpainting system 102 over prior systems in accordance with one or more embodiments. Specifically, FIG. 10 illustrates a table of experiment-based metrics indicating quality improvements of the wire inpainting system 102. Thereafter, FIG. 11 illustrates example comparisons between images generated by the wire inpainting system 102 and other systems.

As illustrated in FIG. 10, the table 1002 includes experimental results from various inpainting models. To generate the results in the table 1002, experimenters applied the illustrated models to a synthetic wire inpainting evaluation dataset that includes one thousand images. As shown, the wire inpainting system 102 achieves the highest perceptual quality, as indicated by the FID score (lower is better).

As illustrated in FIG. 11, a number of models generate inpainted digital images from input images, and the results are separated into model-specific columns. As shown, the wire inpainting system 102 performs more accurate wire inpainting than the PatchMatch model as described by Connelly Barnes, Eli Shechtman, Adam Finkelstein, and Dan B. Goldman in *Patchmatch: A Randomized Correspondence Algorithm for Structural Image Editing*, ACM Trans. Graph 28(3):24 (2009), the latent diffusion model ("LDM") model as described by Robin Rombach, Andreas Blattmann, Dominik Lorenz, Patrick Esser, and Björn Ommer in *High-Resolution Image Synthesis with Latent Diffusion Models*, Proceedings of the IEEE Conf. on Comp. Vision and Pattern Recognition, 10684-95 (2022), and the Big-LaMa model as described by Roman Suvorov et al. as cited above. Indeed, as shown, the various models generate inpainted images from the input images in the far left column. As indicated, the inpainted images the far right column are more realistic that those of the other models, including fewer pixel artifacts and exhibiting better structure completion.

Figure 12:
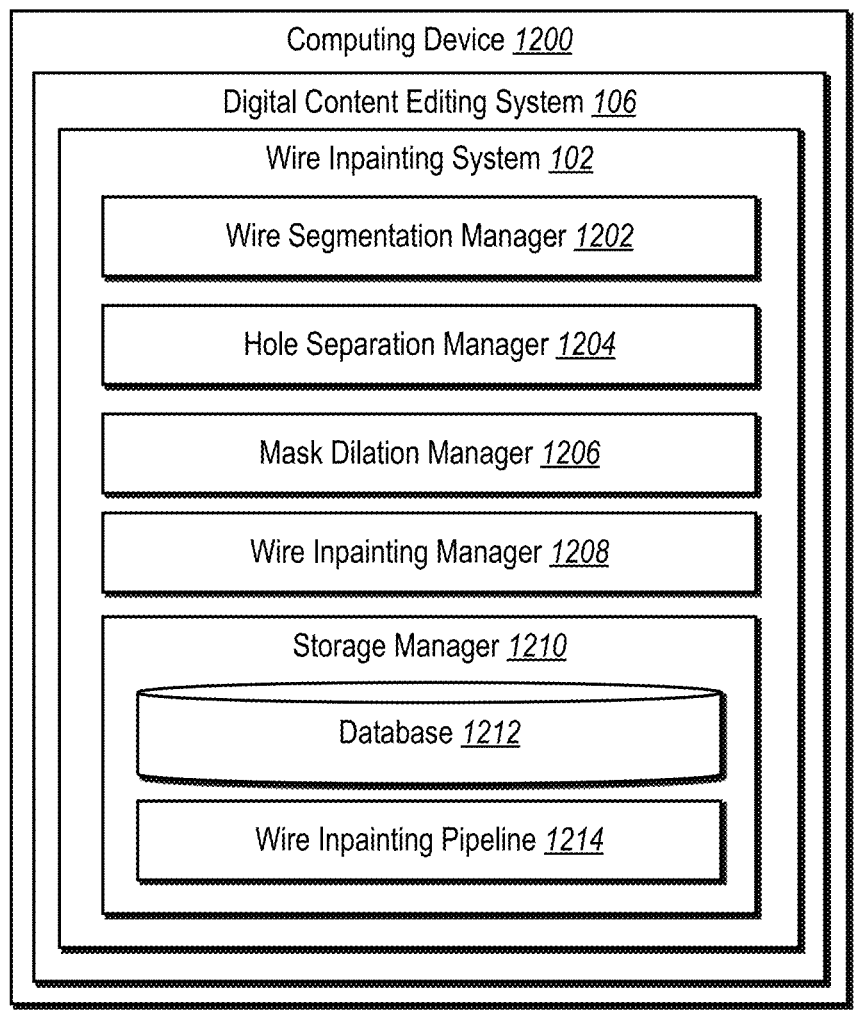
FIG. 12 illustrates an example schematic diagram of a wire inpainting system in accordance with one or more embodiments.

Looking now to FIG. 12, additional detail will be provided regarding components and capabilities of the wire inpainting system 102. Specifically, FIG. 12 illustrates an example schematic diagram of the wire inpainting system 102 on an example computing device 1200 (e.g., one or more of the client device 108 and/or the server(s) 104). As shown in FIG. 12, the wire inpainting system 102 includes a wire segmentation manager 1202, a hole separation manager 1204, a mask dilation manager 1206, a wire inpainting manager 1208, and a storage manager 1210.

As just mentioned, the wire inpainting system 102 includes a wire segmentation manager 1202. In particular, the wire segmentation manager 1202 manages, maintains, generates, identifies, extracts, segments, or determines wire segmentations from a digital image. For example, wire segmentation manager 1202 uses a wire segmentation model and/or a scene semantic segmentation model to generate a wire segmentation mask and/or a digital image segmentation map from the digital image.

In addition, the wire inpainting system 102 includes a hole separation manager 1204. In particular, the hole separation manager 1204 manages, maintains, determines, identifies, detects, extracts, separates, or generates wire holes from a wire segmentation mask and/or a digital image segmentation map. For example, the hole separation manager 1204 uses a hole separation model to extract patch-based wire holes and deep wire holes for inpainting using different models.

As further illustrated in FIG. 12, the wire inpainting system 102 includes a mask dilation manager 1206. In particular, the mask dilation manager 1206 manages, maintains, generates, identifies, or determines dilations for masked wire pixels (e.g., of a wire hole). For example, the mask dilation manager 1206 uses a mask dilation model to dilate boundary pixels of a wire for more accurate identification of wire pixels for inpainting.

Additionally, the wire inpainting system 102 includes a wire inpainting manager 1208. In particular, the wire inpainting manager 1208 manages, maintains, determines, generates, or inpaints a modified digital image by inpainting wire pixels indicated by one or more dilated wire holes. For example, the wire inpainting manager 1208 uses a patch-based inpainting model and/or a deep inpainting model to inpaint wire pixels to remove the appearance of wires in a digital image.

The wire inpainting system 102 further includes a storage manager 1210. The storage manager 1210 operates in conjunction with the other components of the wire inpainting system 102 and includes one or more memory devices such as the database 1212 (e.g., the database 112) that stores various data such as digital images and various models described herein. As shown, the storage manager 1210 also manages or maintains the wire inpainting pipeline 1214 (e.g., the wire inpainting pipeline 1214) that includes the models described herein for removing wires from digital images.

In one or more embodiments, each of the components of the wire inpainting system 102 are in communication with one another using any suitable communication technologies. Additionally, the components of the wire inpainting system 102 are in communication with one or more other devices including one or more client devices described above. It will be recognized that although the components of the wire inpainting system 102 are shown to be separate in FIG. 12, any of the subcomponents may be combined into fewer components, such as into a single component, or divided into more components as may serve a particular implementation. Furthermore, although the components of FIG. 12 are described in connection with the wire inpainting system 102, at least some of the components for performing operations in conjunction with the wire inpainting system 102 described herein may be implemented on other devices within the environment.

The components of the wire inpainting system 102 include software, hardware, or both. For example, the components of the wire inpainting system 102 include one or more instructions stored on a computer-readable storage medium and executable by processors of one or more computing devices (e.g., the computing device 1200). When executed by the one or more processors, the computer-executable instructions of the wire inpainting system 102 cause the computing device 1200 to perform the methods described herein. Alternatively, the components of the wire inpainting system 102 comprise hardware, such as a special purpose processing device to perform a certain function or group of functions. Additionally, or alternatively, the components of the wire inpainting system 102 include a combination of computer-executable instructions and hardware.

Furthermore, the components of the wire inpainting system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the wire inpainting system 102 may be implemented as part of a stand-alone application on a personal computing device or a mobile device. Alternatively, or additionally, the components of the wire inpainting system 102 may be implemented in any application that allows creation and delivery of content to users, including, but not limited to, applications in ADOBE® EXPERIENCE MANAGER and CREATIVE CLOUD®, such as PHOTOSHOP®, LIGHTROOM®, and INDESIGN®. "ADOBE," "ADOBE EXPERIENCE MANAGER," "CREATIVE CLOUD," "PHOTOSHOP," "LIGHTROOM," and "INDESIGN" are either registered trademarks or trademarks of Adobe Inc. in the United States and/or other countries.

FIGS. 1-12 the corresponding text, and the examples provide a number of different systems, methods, and non-transitory computer readable media for removing wires from a digital image using a hybrid wire removal pipeline. In addition to the foregoing, embodiments can also be described in terms of flowcharts comprising acts for accomplishing a particular result. For example, FIG. 13 illustrates a flowchart of an example sequence or series of acts in accordance with one or more embodiments.

While FIG. 13 illustrates acts according to a particular embodiment, alternative embodiments may omit, add to, reorder, and/or modify any of the acts shown in FIG. 13. The acts of FIG. 13 can be performed as part of a method. Alternatively, a non-transitory computer readable medium can comprise instructions, that when executed by one or more processors, cause a computing device to perform the acts of FIG. 13. In still further embodiments, a system can perform the acts of FIG. 13. Additionally, the acts described herein may be repeated or performed in parallel with one another or in parallel with different instances of the same or other similar acts.

FIG. 13 illustrates an example series of acts 1300 for removing wires from a digital image using a hybrid wire removal pipeline. In particular, the series of acts 1300 includes an act 1302 of generating a wire segmentation mask. For instance, the act 1302 can involve generating, from a digital image, a wire segmentation mask indicating wires depicted within the digital image. The series of acts 1300 also includes an act 1304 of extracting wire holes from the wire segmentation mask. For instance, the act 1304 can involve extracting a first wire hole from a first portion of the wire segmentation mask and a second wire hole from a second portion of the wire segmentation mask. In addition, the series of acts 1300 includes an act 1306 of generating a modified digital image by inpainting the wire holes. For instance, the act 1306 can involve generating a modified digital image by inpainting the first wire hole using a first inpainting model and inpainting the second wire hole using a second inpainting model. In some cases, the act 1306 involves generating a modified digital image by inpainting the first wire hole and the second wire hole using one or more inpainting models based on dilating the first portion and the second portion of the wire segmentation mask. Further, the series of acts 1300 includes an act 1308 of providing the modified digital image for display. For instance, the act 1308 can involve providing the modified digital image for display on a client device.

In some embodiments, the series of acts 1300 includes an act of dilating the wire segmentation mask according to wire diameters at pixel locations. For example, the series of acts 1300 includes an act of dilating the first portion and the second portion of the wire segmentation mask according to respective wire diameters depicted by pixels in the first portion and the second portion.

In one or more embodiments, the series of acts 1300 includes an act of extracting the first wire hole by extracting a portion of the wire segmentation mask corresponding to pixels depicting natural objects. Further, the series of acts 1300 can include an act of extracting the second wire hole by extracting a portion of the wire segmentation mask corresponding to pixels depicting manmade objects. In some cases, the series of acts 1300 includes an act of inpainting the first wire hole using a patch-based inpainting model and/or an act of inpainting the second wire hole using a deep inpainting model.

In certain embodiments, the series of acts 1300 includes an act of dilating the first portion of the wire segmentation mask by a first dilation amount according to a first diameter of a wire depicted by pixels corresponding to the first portion. The series of acts 1300 can also include an act of dilating the second portion of the wire segmentation mask by a second dilation amount according to a second diameter of a wire depicted by pixels corresponding to the second portion. In some cases, the series of acts 1300 includes an act of generating the modified digital image by using a parallel batching technique to inpaint multiple wire holes in parallel using the second inpainting model.

In some embodiments, the series of acts 1300 includes an act of generating a digital image segmentation map indicating pixel segments of the digital image. Further, the series of acts 1300 includes an act of combining the digital image segmentation map with the wire segmentation mask to extract the first wire hole. In certain cases, the series of acts 1300 includes an act of combining an inverted version of the digital image segmentation map with the wire segmentation mask to extract the second wire hole. In one or more embodiments, the series of acts 1300 includes an act of extracting the first wire hole from the first portion of the wire segmentation mask corresponding to pixels depicting a first length of a wire against a natural background and an act of extracting the second wire hole from the second portion of the wire segmentation mask corresponding to pixels depicting a second length of the wire against a manmade background.

In one or more embodiments, the series of acts 1300 includes an act of extracting the first wire hole by extracting a portion of the wire segmentation mask corresponding to pixels depicting a wire against a first background that satisfies a uniformity threshold. Additionally, the series of acts 1300 includes an act of extracting the second wire hole by extracting a portion of the wire segmentation mask corresponding to pixels depicting the wire against a second background that does not satisfy the uniformity threshold.

In certain cases, the series of acts 1300 includes an act of inpainting pixels depicting a first portion of a wire against a first background using the patch-based inpainting model and an act of inpainting pixels depicting a second portion of the wire against a second background using the deep inpainting model. In these or other cases, the series of acts 1300 includes acts of generating a digital image segmentation map indicating pixel segments of the digital image, generating an inverted version of the digital image segmentation map, combining the digital image segmentation map with the wire segmentation mask to extract the first wire hole, and combining the inverted version of the digital image segmentation map with the wire segmentation mask to extract the second wire hole.

In some embodiments, the series of acts 1300 includes an act of using a parallel batching technique that includes: dividing the digital image into a plurality of tiles having a set resolution, identifying a set of tiles from the plurality of tiles that correspond to the first wire hole and the second wire hole extracted from the wire segmentation mask, and inpainting two or more tiles from the set of tiles in parallel using the deep inpainting model. In some cases, the series of acts 1300 includes acts of generating an intermediate digital image by inpainting the first wire hole using the patch-based inpainting model and inpainting the second wire hole within the intermediate digital image utilizing the deep inpainting model.

In one or more embodiments, the series of acts 1300 includes acts of determining a first diameter of a wire at a first location within the digital image and a second diameter of the wire at a second location within the digital image, dilating the first portion of the wire segmentation mask by a first dilation amount according to the first diameter of a wire depicted by pixels corresponding to the first portion, and dilating the second portion of the wire segmentation mask by a second dilation amount according to the second diameter of a wire depicted by pixels corresponding to the second portion. Additionally or alternatively, the series of acts 1300 includes an act of generating a digital image segmentation map indicating pixel segments of the digital image and an act of combining the digital image segmentation map with the wire segmentation mask to extract the first wire hole and the second wire hole.

In some embodiments, the series of acts 1300 includes an act of determining tile batches for parallel inpainting. For example, the series of acts 1300 includes an act of determining tile batches for pixels depicting the first wire hole and the second wire hole of the wire segmentation mask. In certain cases, the series of acts 1300 also includes an act of generating a modified digital image by inpainting the first wire hole and the second wire hole using one or more inpainting models according to the tile batches. Additionally, in some embodiments, the series of acts 1300 includes an act of determining tile batches by: generating a tile grid dividing the digital image into pixel tiles having a set resolution, identifying wire tiles depicting wire pixels from among the pixel tiles of the tile grid, and batching the wire tiles into groups such that wire tiles in a common group do not overlap or overlap by less than a threshold number of pixels.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 14:
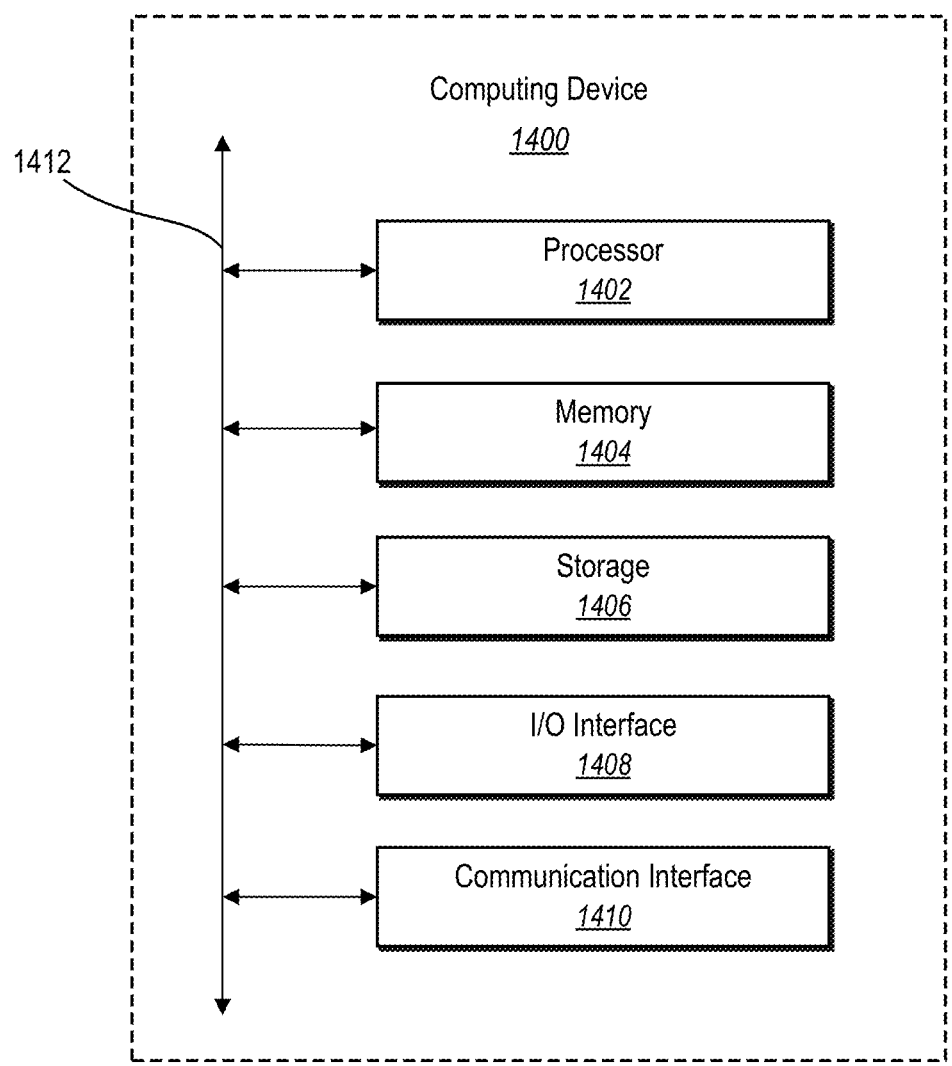
FIG. 14 illustrates a block diagram of an example computing device in accordance with one or more embodiments.

FIG. 14 illustrates, in block diagram form, an example computing device 1400 (e.g., the computing device 1200, the client device 108, and/or the server(s) 104) that may be configured to perform one or more of the processes described above. One will appreciate that the wire inpainting system 102 can comprise implementations of the computing device 1400. As shown by FIG. 14, the computing device can comprise a processor 1402, memory 1404, a storage device 1406, an I/O interface 1408, and a communication interface 1410. Furthermore, the computing device 1400 can include an input device such as a touchscreen, mouse, keyboard, etc. In certain embodiments, the computing device 1400 can include fewer or more components than those shown in FIG. 14. Components of computing device 1400 shown in FIG. 14 will now be described in additional detail.

In particular embodiments, processor(s) 1402 includes hardware for executing instructions, such as those making up a computer program. As an example, and not by way of limitation, to execute instructions, processor(s) 1402 may retrieve (or fetch) the instructions from an internal register, an internal cache, memory 1404, or a storage device 1406 and decode and execute them.

The computing device 1400 includes memory 1404, which is coupled to the processor(s) 1402. The memory 1404 may be used for storing data, metadata, and programs for execution by the processor(s). The memory 1404 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1404 may be internal or distributed memory.

The computing device 1400 includes a storage device 1406 includes storage for storing data or instructions. As an example, and not by way of limitation, storage device 1406 can comprise a non-transitory storage medium described above. The storage device 1406 may include a hard disk drive (HDD), flash memory, a Universal Serial Bus (USB) drive or a combination of these or other storage devices.

The computing device 1400 also includes one or more input or output ("I/O") devices/interfaces 1408, which are provided to allow a user to provide input to (such as user strokes), receive output from, and otherwise transfer data to and from the computing device 1400. These I/O devices/interfaces 1408 may include a mouse, keypad or a keyboard, a touch screen, camera, optical scanner, network interface, modem, other known I/O devices or a combination of such I/O devices/interfaces 1408. The touch screen may be activated with a writing device or a finger.

The I/O devices/interfaces 1408 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1408 is configured to provide graphical data to a display for presentation to a user. The graphical data may be representative of one or more graphical user interfaces and/or any other graphical content as may serve a particular implementation.

The computing device 1400 can further include a communication interface 1410. The communication interface 1410 can include hardware, software, or both. The communication interface 1410 can provide one or more interfaces for communication (such as, for example, packet-based communication) between the computing device and one or more other computing devices 1400 or one or more networks. As an example, and not by way of limitation, communication interface 1410 may include a network interface controller (NIC) or network adapter for communicating with an Ethernet or other wire-based network or a wireless NIC (WNIC) or wireless adapter for communicating with a wireless network, such as a WI-FI. The computing device 1400 can further include a bus 1412. The bus 1412 can comprise hardware, software, or both that couples components of computing device 1400 to each other.

In the foregoing specification, the invention has been described with reference to specific example embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
generating, utilizing a scene semantic segmentation model, a digital image segmentation map from a digital image;
generating, utilizing a wire segmentation model, a wire segmentation mask indicating wires depicted within the digital image;
generating a hole selection mask by combining the digital image segmentation map and the wire segmentation mask;
extracting a first wire hole from a first portion of the hole selection mask and a second wire hole from a second portion of the hole selection mask;
dilating the first portion and the second portion of the hole selection mask according to respective wire diameters depicted by pixels in the first portion and the second portion;
generating a modified digital image by inpainting the first wire hole and the second wire hole using one or more inpainting models based on dilating the first portion and the second portion of the hole selection mask; and
providing the modified digital image for display on a client device.

2. The computer-implemented method of claim 1, wherein:
extracting the first wire hole comprises extracting a portion of the hole selection mask corresponding to pixels depicting natural objects; and
extracting the second wire hole comprises extracting a portion of the hole selection mask corresponding to pixels depicting manmade objects.

3. The computer-implemented method of claim 1, wherein generating the modified digital image comprises:
inpainting the first wire hole using a patch-based inpainting model; and
inpainting the second wire hole using a deep inpainting model.

4. The computer-implemented method of claim 1, wherein dilating the first portion and the second portion of the hole selection mask comprises:
dilating the first portion of the hole selection mask by a first dilation amount according to a first diameter of a wire depicted by pixels corresponding to the first portion; and
dilating the second portion of the hole selection mask by a second dilation amount according to a second diameter of a wire depicted by pixels corresponding to the second portion.

5. The computer-implemented method of claim 1, wherein generating the modified digital image comprises using a parallel batching technique to inpaint multiple wire holes in parallel using the one or more inpainting models.

6. The computer-implemented method of claim 1, wherein extracting the first wire hole and the second wire hole from the wire segmentation mask further comprises:
generating an inverted digital image segmentation map indicating pixel segments of the digital image;
combining the digital image segmentation map with the wire segmentation mask to extract the first wire hole; and
combining the inverted digital image segmentation map with the wire segmentation mask to extract the second wire hole.

7. The computer-implemented method of claim 1, wherein extracting the first wire hole and the second wire hole from the hole selection mask comprises:
extracting the first wire hole from the first portion of the hole selection mask corresponding to pixels depicting a first length of a wire against a natural background; and
extracting the second wire hole from the second portion of the hole selection mask corresponding to pixels depicting a second length of the wire against a manmade background.

8. A system comprising:
one or more memory devices; and
one or more processors coupled to the one or more memory devices that cause the system to perform operations comprising:
generating, utilizing a scene semantic segmentation model, a digital image segmentation map from a digital image;
generating, utilizing a wire segmentation model, a wire segmentation mask indicating wires depicted within the digital image;
generating a hole selection mask by combining the digital image segmentation map and the wire segmentation mask;

extracting one or more wire holes from the hole selection mask;
determining tile batches for pixels depicting the one or more wire holes of the wire segmentation mask; and
generating a modified digital image by inpainting the one or more wire holes using one or more inpainting models according to the tile batches.

9. The system of claim 8, wherein determining the tile batches comprises:
generating a tile grid dividing the digital image into pixel tiles having a set resolution;
identifying wire tiles depicting wire pixels from among the pixel tiles of the tile grid; and
batching the wire tiles into groups such that wire tiles in a common group do not overlap or overlap by less than a threshold number of pixels.

10. The system of claim 8, wherein generating the modified digital image comprises:
inpainting pixels depicting a first portion of a wire against a first background using a patch-based inpainting model; and
inpainting pixels depicting a second portion of the wire against a second background using a deep inpainting model.

11. The system of claim 8, wherein extracting the one or more wire holes from the hole selection mask comprises:
dilating a first portion of the hole selection mask by a first dilation amount; and
dilating a second portion of the hole selection mask by a second dilation amount.

12. The system of claim 8, wherein generating the modified digital image comprises inpainting two or more tiles from a tile batch of the tile batches in parallel using the one or more inpainting models.

13. The system of claim 8, wherein extracting the one or more wire holes from the hole selection mask comprises:
generating an inverted digital image segmentation map indicating pixel segments of the digital image;
combining the digital image segmentation map with the wire segmentation mask to extract a first wire hole; and
combining the inverted digital image segmentation map with the wire segmentation mask to extract a second wire hole.

14. The system of claim 8, wherein generating the modified digital image comprises:
generating an intermediate digital image by inpainting a first wire hole using a first inpainting model; and
inpainting a second wire hole within the intermediate digital image utilizing a second inpainting model.

15. A non-transitory computer readable medium storing executable instructions which, when executed by at least one processor, cause the at least one processor to perform operations comprising:
generating, utilizing a scene semantic segmentation model, a digital image segmentation map from a digital image;
generating, utilizing a wire segmentation model, a wire segmentation mask indicating wires depicted within the digital image;
generating a hole selection mask by combining the digital image segmentation map and the wire segmentation mask;
extracting a first wire hole from a first portion of the hole selection mask and a second wire hole from a second portion of the hole selection mask;
generating a modified digital image by inpainting the first wire hole using a first inpainting model and inpainting the second wire hole using a second inpainting model; and
providing the modified digital image for display on a client device.

16. The non-transitory computer readable medium of claim 15, wherein generating the modified digital image comprises:
inpainting the first wire hole corresponding to pixels depicting a wire against a first background satisfying a uniformity threshold using a patch-based inpainting model; and
inpainting pixels depicting a second portion of the wire against a second background not satisfying the uniformity threshold using a deep inpainting model.

17. The non-transitory computer readable medium of claim 15, wherein generating the modified digital image comprises inpainting the first wire hole using a patch-based inpainting model and inpainting the second wire hole using a deep inpainting model in parallel.

18. The non-transitory computer readable medium of claim 15, wherein extracting the first wire hole and the second wire hole from the hole selection mask comprises:
determining a first diameter of a wire at a first location within the digital image and a second diameter of the wire at a second location within the digital image;
dilating the first portion of the hole selection mask by a first dilation amount according to the first diameter of a wire depicted by pixels corresponding to the first portion; and
dilating the second portion of the hole selection mask by a second dilation amount according to the second diameter of a wire depicted by pixels corresponding to the second portion.

19. The non-transitory computer readable medium of claim 15, wherein one or more of the first inpainting model or the second inpainting model comprise parameters for color adjustment learned by determining color differences for onion-peel color regions of the digital image.

20. The non-transitory computer readable medium of claim 15, wherein generating the modified digital image comprises:
generating an intermediate digital image by inpainting the first wire hole using a patch-based inpainting model; and
inpainting the second wire hole within the intermediate digital image utilizing a deep inpainting model.

* * * * *